(12) United States Patent
Ho et al.

(10) Patent No.: US 8,213,978 B1
(45) Date of Patent: Jul. 3, 2012

(54) ESTIMATING MOBILE LOCAL PROPAGATION ENVIRONMENT CHARACTERISTICS FOR WIRELESS COMMUNICATIONS

(75) Inventors: Ming-Ju Ho, Alpharetta, GA (US); Ali Jabbary, Roswell, GA (US); Stalin Albanes, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1249 days.

(21) Appl. No.: 11/214,425

(22) Filed: Aug. 29, 2005

(51) Int. Cl.
*H04B 7/00* (2006.01)

(52) U.S. Cl. ........ 455/522; 455/517; 455/523; 455/521; 455/404.1; 455/404.2; 455/67.11; 455/456.5; 455/456.6; 455/452.1; 455/452.2; 370/328; 370/329; 370/227

(58) Field of Classification Search ............... 455/456.5, 455/456.6, 456.2, 456.1, 522, 517, 523, 521, 455/404.1, 404.2, 67.11, 452.1, 452.2; 370/335, 370/229, 328, 329, 227
See application file for complete search history.

(56) References Cited

U.S. PATENT DOCUMENTS

| | | | |
|---|---|---|---|
| 6,195,337 B1 | 2/2001 | Nystrom et al. | |
| 6,487,417 B1* | 11/2002 | Rossoni et al. | ............ 455/67.16 |
| 6,697,644 B2 | 2/2004 | Scherzer et al. | |
| 6,728,304 B2* | 4/2004 | Brown et al. | ................. 375/148 |
| 6,766,168 B1 | 7/2004 | Lim | |
| 6,829,491 B1 | 12/2004 | Yea et al. | |
| 6,850,736 B2 | 2/2005 | McCune, Jr. | |
| 6,928,280 B1 | 8/2005 | Xunthos et al. | |
| 2002/0101943 A1* | 8/2002 | Proctor, Jr. | ..................... 375/346 |
| 2003/0123413 A1* | 7/2003 | Moon et al. | ................... 370/335 |
| 2004/0048623 A1* | 3/2004 | Flannery | .................... 455/456.6 |
| 2004/0203904 A1* | 10/2004 | Gwon et al. | ............... 455/456.1 |
| 2005/0054296 A1 | 3/2005 | Chuang et al. | |
| 2005/0057370 A1 | 3/2005 | Warrior et al. | |
| 2005/0226152 A1* | 10/2005 | Stephens et al. | ............... 370/230 |
| 2005/0232147 A1 | 10/2005 | Bang et al. | |
| 2006/0009159 A1 | 1/2006 | Laung et al. | |
| 2006/0019679 A1* | 1/2006 | Rappaport et al. | ......... 455/456.5 |
| 2006/0240834 A1* | 10/2006 | Sawaya et al. | ................. 455/446 |
| 2007/0265020 A1* | 11/2007 | Cuffaro | ...................... 455/456.5 |
| 2011/0182214 A1* | 7/2011 | Hoffmann et al. | ............ 370/277 |

* cited by examiner

*Primary Examiner* — Danh Le
*Assistant Examiner* — Khai M Nguyen
(74) *Attorney, Agent, or Firm* — Turocy & Watson, LLP

(57) ABSTRACT

Characterization and enhancement of a mobile local scattering environment. The system includes a channel component and a link control component, wherein the channel component facilitates communication of a ping signal, which is used to estimate the delay spread characteristics and/or angle of arrival in order to characterize the mobile local scattering environment. This information is sent to the link control component, which enhances radio link performance based on the received information. The system can be used to assist in E-911 location applications, such as determining the location of an indoor user.

54 Claims, 25 Drawing Sheets

ESTIMATING MOBILE LOCAL PROPAGATION ENVIRONMENT CHARACTERISTICS FOR WIRELESS COMMUNICATIONS

TECHNICAL FIELD

The invention relates generally to wireless communications, and more specifically, to characterizing a mobile local scattering environment and thereby enhancing radio link performance.

BACKGROUND

Radio propagation is generally governed by three basic propagation mechanisms: reflection, diffraction, and scattering. Multipath fading and shadowing are two types of large scale fading occurrences for signals. The reflection of various types of signals causes fluctuation in the phase and amplitude of the received signal—known as multipath fading. Multipath fading occurs when communicated signals travel through multiple paths from a transmitter to a receiver and consequently arrive with different time delays, phases, and power levels. Shadowing refers to the distortion as a result of diffraction and scattering loss. The severity of fading occurrences can depend on the local topography of the area surrounding the receiver(s).

Current attempts to mitigate the effects of fading in wireless communications have not been successful. Mechanisms to minimize multipath fading include implementing antenna diversity, equalizers, and RAKE receivers in base stations/receivers. Methods to minimize shadowing include implementing macroscopic diversity and fade margin. Macroscopic diversity is effective, but requires wide special separation of antenna branches—unfeasible for mobile devices. Typically, several decibels of link budget are reserved as fade margin to accommodate signal variation. However, a high fade margin requires dense cell deployment, resulting in high output power and more expense on the cellular operator.

The fading issues are multiplied for indoor coverage. Depending on the building type, size, materials, age, and configuration, indoor signals must be strong enough to cover the approximately 20 dB or more penetration loss when traveling through walls and windows. Furthermore, high speed data applications that use complex modulation and coding schemes require an even higher signal to noise ratio. Because of the inability to accurately locate an indoor user, implementations of E-911 location technology, such as Enhanced Time Difference of Arrival (E-TDOA) and Assisted GPS (A-GPS), are ineffective. Additionally, base stations that are deployed outdoors can require high output power and/or dense placement—either of which create interference for outdoor users. Base stations deployed indoors are expensive, unless significant in-building traffic can be identified.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention relates to characterization of a mobile local scattering environment and enhancing radio link performance based on the environment characteristics. In support thereof, an environment characterization system is provided having a channel component and a link control component. The channel component characterizes a communications environment and sends that information to a link control component. The link control component enhances or adjusts link performance based on the received information.

The channel component requests a channel estimation task, which can be periodic or on-demand. The channel component transmits and receives a low power short pulse, referred to as a ping signal, and estimates the delay spread characteristics and angle of arrival, which are used to characterize the mobile local scattering environment. The receiver for the ping signal may be integrated with or separate from the channel component. The monitoring duration of the receiver is set according to the delay spread characteristics. If the monitoring window does not capture enough energy from the initial ping signal to make an adequate estimation, subsequent ping signals of various power levels are communicated until sufficient energy is captured. The channel component sends the mobile local scattering environment information to a link control component.

The link control component receives the mobile local scattering environment information and accordingly adapts itself to enhance link performance. Such adaptation may include, for example, adjusting the transmit power level, turning on transmitter diversity, and using a different modulation coding scheme. The link control component may also apply the information to E-911 location functionality, such as identifying the indoor location of the channel component user.

To the accomplishment of the foregoing and related ends, certain illustrative aspects of the invention are described herein in connection with the following description and the annexed drawings. These aspects are indicative of various ways in which the invention may be practiced, all of which are intended to be covered by the invention. Other advantages and novel features of the invention may become apparent from the following detailed description of the invention when considered in conjunction with the drawings.

DETAILED DESCRIPTION

Figure 1:
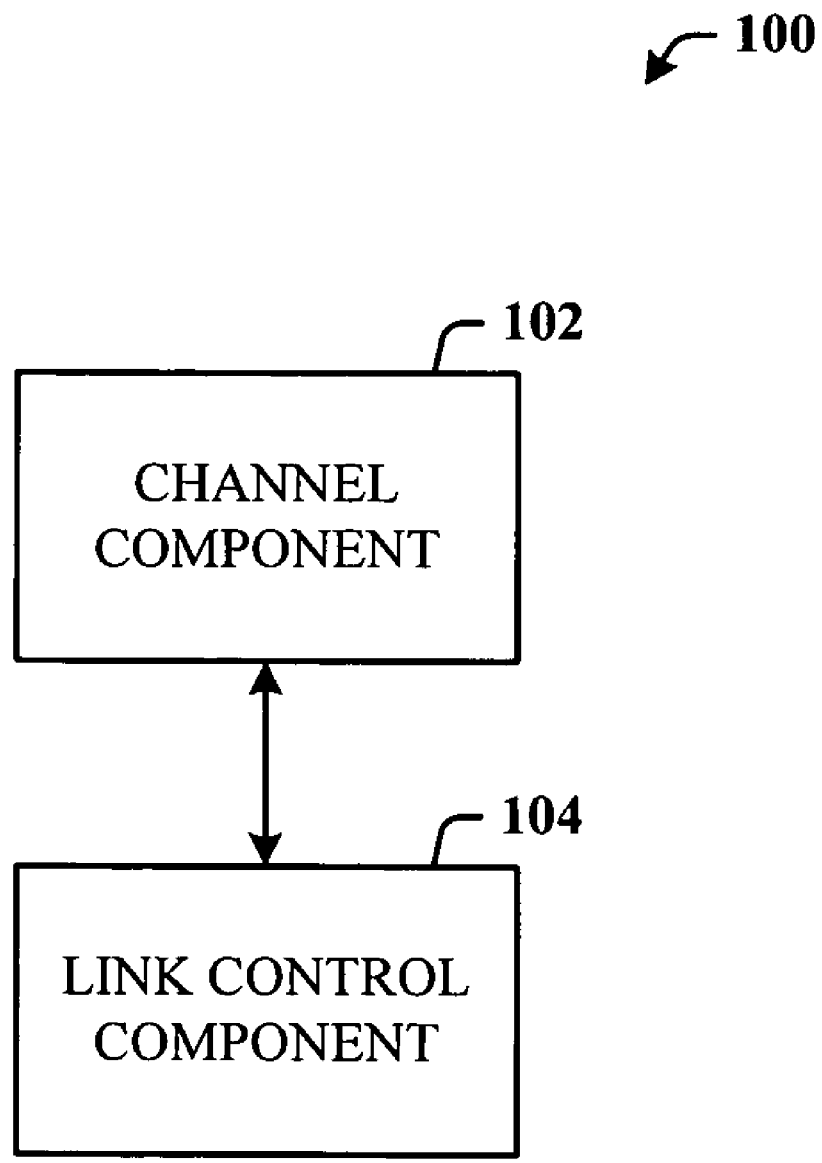
FIG. 1 illustrates a system that facilitates estimation of mobile local propagation environment characteristics in accordance with the invention.

The invention is now described with reference to the drawings, wherein like reference numerals are used to refer to like elements throughout. In the following description, for purposes of explanation, numerous specific details are set forth in order to provide a thorough understanding of the invention. It may be evident, however, that the invention may be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Initially referring to the drawings, FIG. 1 illustrates a system 100 that facilitates estimation of mobile local propagation environment characteristics in accordance with the invention. The system 100 includes a channel component 102 that employs a channel estimation task that determines link characteristics data based on communication of a ping signal. The channel component 102 can be employed in the form of a client application of a device. The system 100 also includes a link control component 104 that receives the link characteristics data and controls itself to control link performance based on the link characteristics data.

Generally, the system 100 facilitates enhancing link performance based on the characteristics data of the surrounding local mobile environment. The channel component 102 can be included or integrated with a mobile client or handset. In one implementation, the channel component 102 is primarily responsible for characterizing the mobile local scattering environment and providing this information to the link control component 104.

The link control component 104 may be integrated with a base station, another mobile client, or another handset. The link control component 104 receives the link characteristics data relating to environment characterization and uses it to adapt itself to control link performance. Typically, the link control component 104 will adjust link performance to enhance communications between itself and the channel component 102 (e.g., the base station and the handset, respectively). However, this need not be the case. For example, there can be instances where it is desirable to not enhance link performance from its current state or even reduce performance of the link channel as a security measure based on a number of different criteria. This can include situations where the user of the handset is not authorized to communicate, yet the security procedure is to allow reduced communications until the user can be properly identified and/or located.

As described supra, the channel component 102 performs local radio propagation environment characterization and then transmits the characteristics data to the link control component 104. In another implementation, the link control component 104 can also assist in characterizing the local environment. Additionally, there can be more than one link control component 104 and/or more than one channel component 102 in the system 100. This is described in more detail infra.

In one example, the channel component 102, as part of the mobile handset, enters, registers, and characterizes a local environment. The channel component 102 aggregates the relevant information and sends it to the link control component 104. The link control component 104 receives the information and adapts itself accordingly. Optionally, the link control component 104 can record the characterization or settings for future use.

In another example, the channel component 102, as part of the mobile handset, for example, leaves the local environment and re-enters at a later time. Upon registration of the channel component 102, the link control component 104 recognizes the registration and assists, at least in part, in the characterization of the local environment. In addition or alternatively, the link control component 104 can automatically set its link performance settings upon notification of re-registration based on the prior characterization and saved settings.

Furthermore, the link control component 104 can process the characterizations data of multiple channel components 102 (e.g., multiple handsets) in the same local environment. In one instance, each channel component 102 individually registers and characterizes the local environment, and the link control component 104 subsequently processes the information from each channel component 102 and supports each channel component 102 separately. In another instance, the link control component 104 supports all the channel components 102 in an environment based on the characterization of a few channel components 102. The link control component 104 can also act on behalf of all the channel components 102 in an environment based on a single channel component 104.

Figure 2:
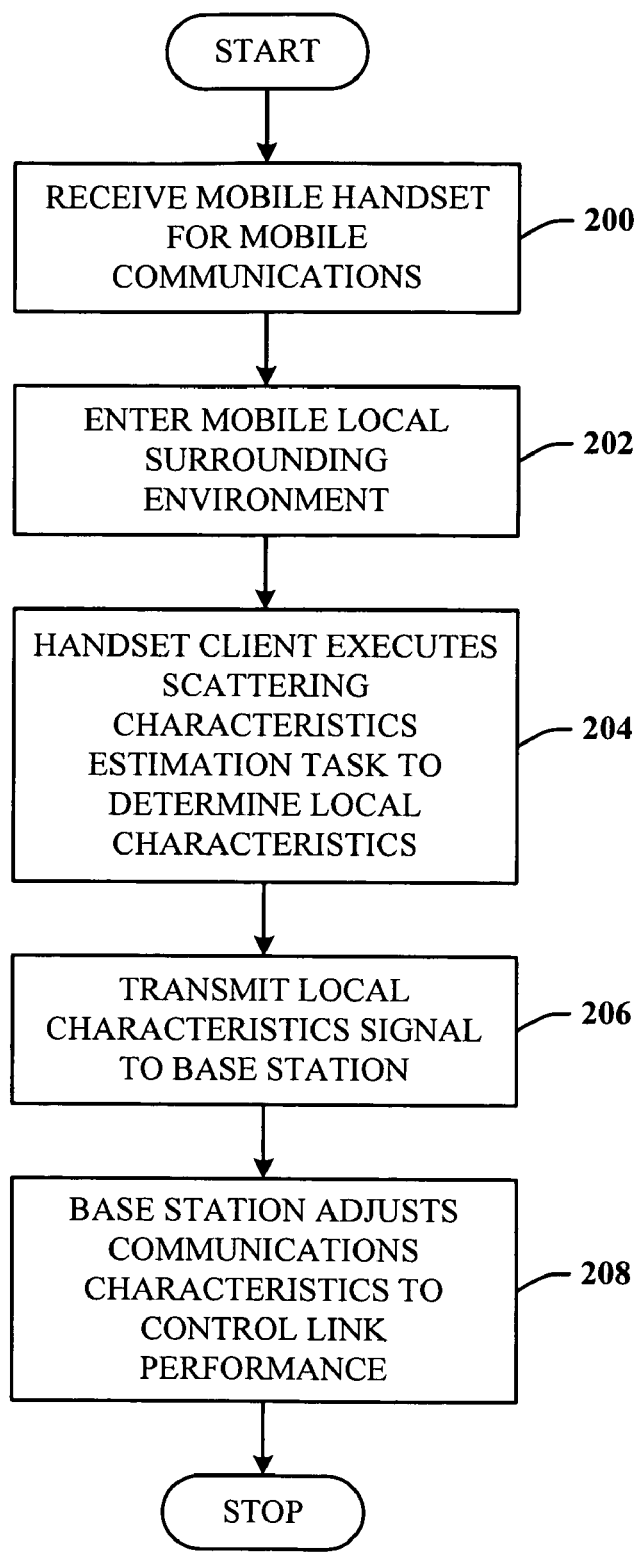
FIG. 2 illustrates a methodology of controlling link performance in accordance with a disclosed innovation.

FIG. 2 illustrates a methodology of controlling link performance in accordance with a disclosed innovation. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a mobile handset is received that employs a channel component as a client application. At 202, the handset enters a local communications environment, such as is associated with a base station. At 204, the handset channel component (or client) executes a scattering characteristics estimation task to determine local radio propagation characteristics data of the local base station environment. At 206, one the estimation task completes and the local characteristics data is determined, the handset client facilitates transmission of the characteristics data the link control component (e.g., base station). The link control component then processes the characteristics data and causes adjustment of the communications link between the channel component (e.g., the handset) and the link control component (e.g., the base station). This typically includes a power level adjustment in the link to enhance channel communications between the handset and the base station.

Figure 3A:
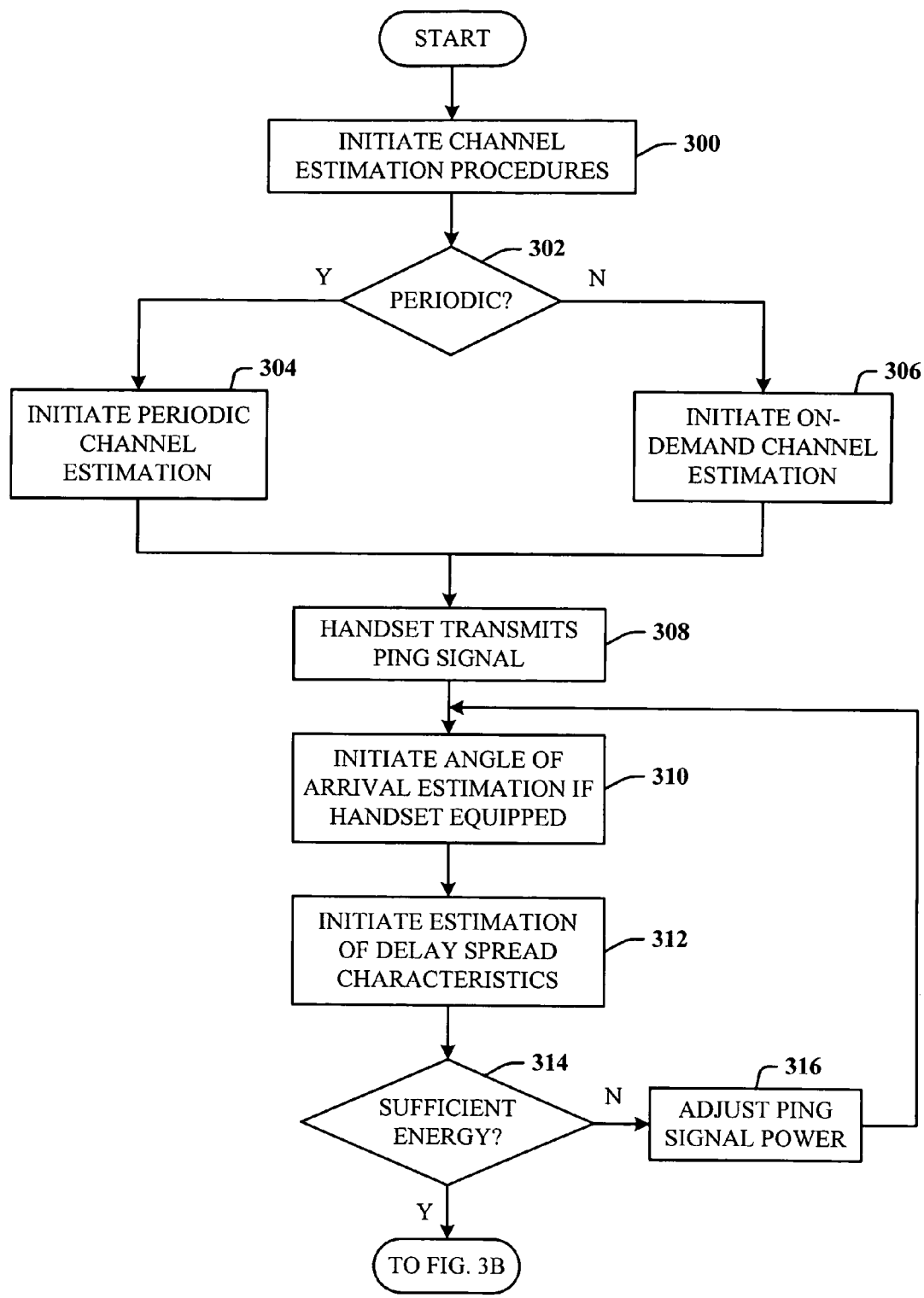
FIGS. 3A and 3B illustrate a methodology of requesting a channel estimation task according to an aspect.
Figure 3B:
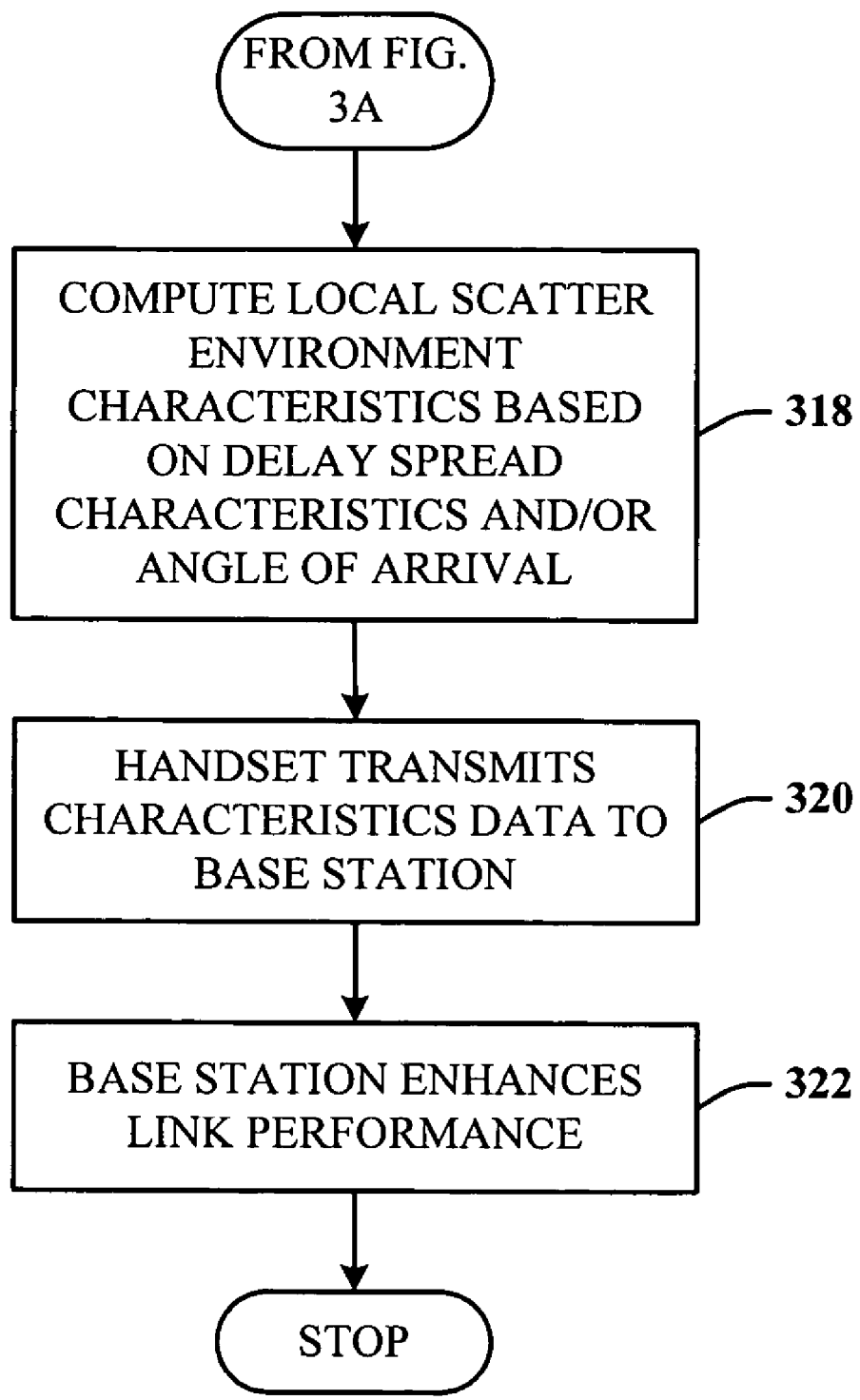

FIGS. 3A and 3B illustrate a methodology of requesting a channel estimation task according to an aspect. Referring to FIG. 3A, at 300, the channel estimation task is initiated. At 302, the system queries whether the task is to be initiated periodically. If yes, flow is to 304 to initiate the task periodically. Periodic can be via a counter or timer that is used to trigger periodic measurement of the local environment. If not, flow is from 302 to 306 to initiate the estimate task on-demand according to other criteria. On-demand can be based on, for example, call initialization/registration, cell selection (when the user moves across a cell boundary into another cell, for example), radio performance degradation of the environment or an E-911 location request. In either case, flow is to 308 where the handset transmits a ping signal. The ping signal is a low power short pulse, when permitted, and its carrier signal can be inside or outside the operation band.

After transmission of the ping signal, the mobile handset can capture and resolve the different multipath propagation echoes in a number of different ways. The handset can immediately switch to receive mode after transmission of the ping signal. The receiver implements a sliding correlator where the transmitted sequence is "slid" over the local sequence held in the receiver during a process of correlation. The received signal represents the convolution of this pulse with the channel impulse response. A peak is the output is produced when the two sequences substantially match. Alternatively, a separate dedicated receiver can be used for ping signal reception.

At 310, angle-of-arrival (AOA) estimation can be initiated, if the technique can be employed. If an antenna array is implemented in the mobile handset, the AOA can be estimated by observing which antenna element received the most signal energy. At 312, estimation of delay characteristics can be initiated. Depending on the number of reflections and the propagation speed in different signals, all these signals do not arrive exactly at the same time at the receiver. Thus, the delay spread characteristics can be estimated. For example, the RMS (root mean square) delay spread is the standard deviation (second central moment) value of the delay of reflections (impulse response or the width of power delay profile), weighted proportional to the energy in the reflected wave. The receive monitoring or measurement window is set according to the interest of delay spread characteristics. Usually, the monitoring duration is set as five times the target RMS delay spread.

At 314, the system determines if the signal has sufficient energy. If not, flow is to 316 where the ping signal power is adjusted to provide sufficient return energy. Depending upon the amount of energy picked or captured during the monitoring window, another short pulse can be transmitted at a different power level than the previous pulse. The power can be a higher or lower power. This step can be repeated as necessary to achieve the desired results. The delay spread characteristics can be estimate or a conclusion drawn that the delay spread is more than the monitoring window. If there is sufficient pulse energy, flow is from 314 to 318, at FIG. 3B, where the local scatter environment characteristics are computed based on the delay spread characteristics and/or the AOA data. At 320, the handset transmits the local environment characteristics data back to the base station. At 322, the base station processes the data and controls (e.g., enhances) the link performance between he handset and the base station. The base station can enhance link performance by adjusting the signal power, turning on transmitter diversity, and/or using a different modulation coding scheme, for example.

Figure 4:
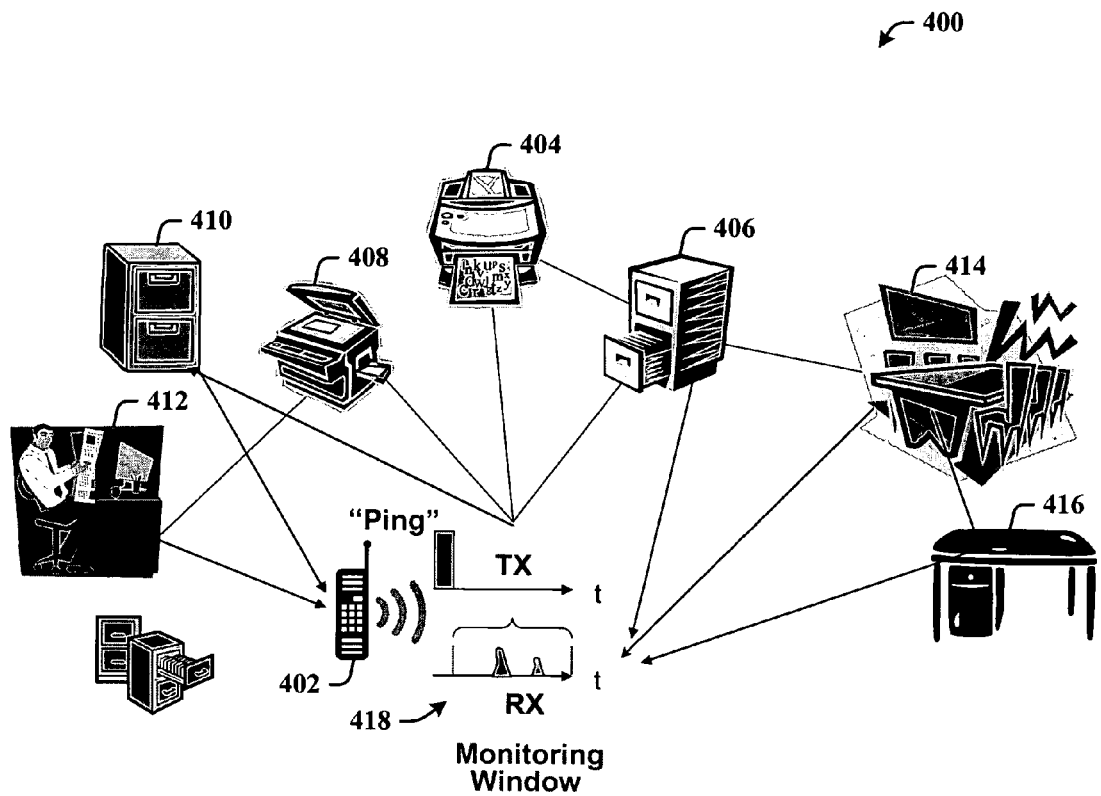
FIG. 4 illustrates is a diagram that illustrates ping signal radio propagation signaling according to an aspect.

FIG. 4 is a diagram 400 that illustrates ping signal radio propagation signaling according to an aspect. In one implementation, a handset 402 transmits a ping signal pulse that that impacts a variety of different local environment objects. For example, the transmitted signal can impact a printer 404, a file cabinet 406, copier 408, and a second file cabinet 410. The return signal received by the handset 402 can be received by different radio propagation mechanisms, such as reflection, diffraction, and scattering. For example, the ping signal to the copier 408 reflects to a desk 412 and finally is received by the handset 402. The ping signal to the printer 404 scatters to the file cabinet 406, then to a desk 414 and a table 416 the scattered results reaching the handset 402. The monitoring window is set, and illustrates two peaks 418 in the local environment for the location at which the handset 402 currently resides. These peaks 418 can change as the handset 402 moves throughout the environment.

Figure 5:
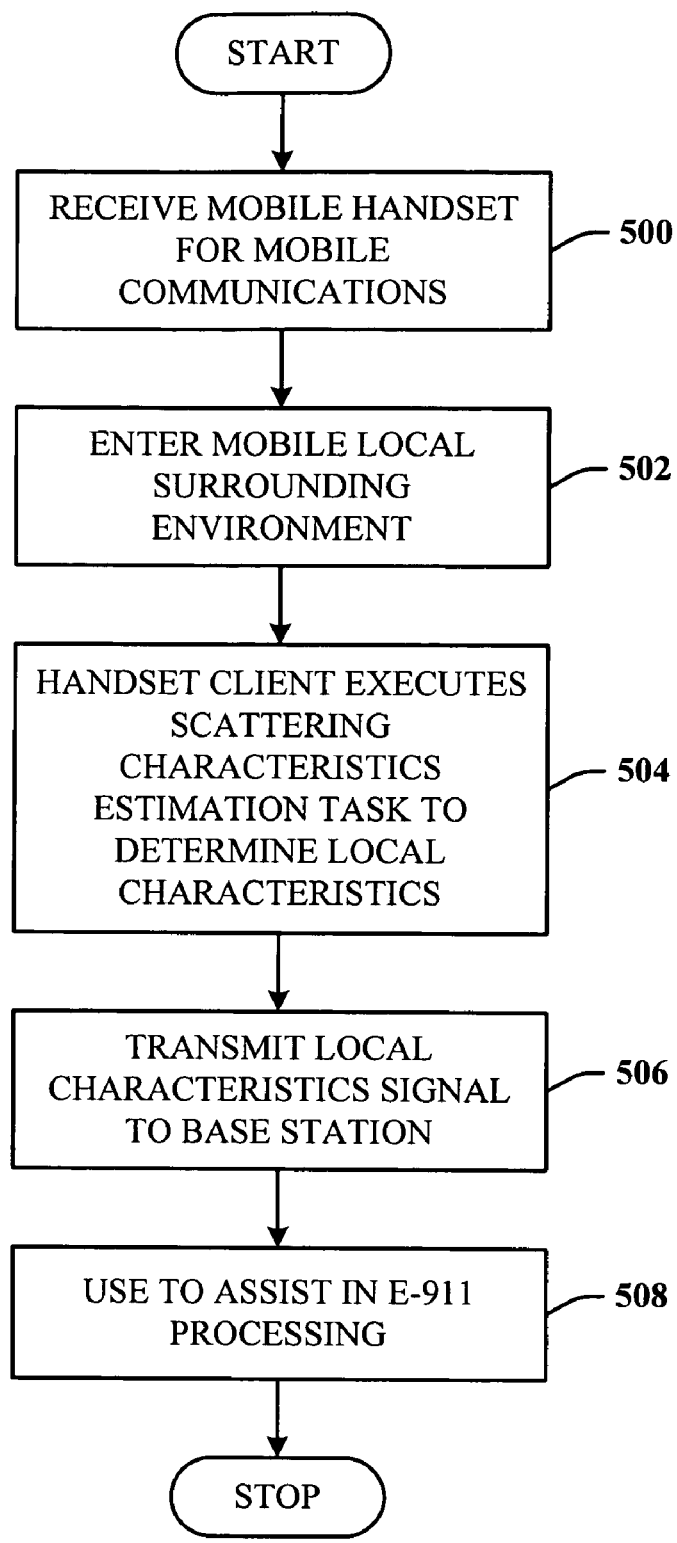
FIG. 5 illustrates a flow diagram of a methodology of assisting E-911 location technology in accordance with the invention.

FIG. 5 illustrates a flow diagram of a methodology of assisting E-911 location technology in accordance with the invention. At 500, a mobile handset is received with a client that facilitates estimation of radio propagation characteristics. At 502, the handset enters the local environment. At 504, the handset client executes a scattering characteristics estimation task that determines local radio propagation characteristics. At 506, the characteristics data is transmitted to the base station. At 508, the base station processes the data to assist in E-911 location determination of the handset.

Figure 6:
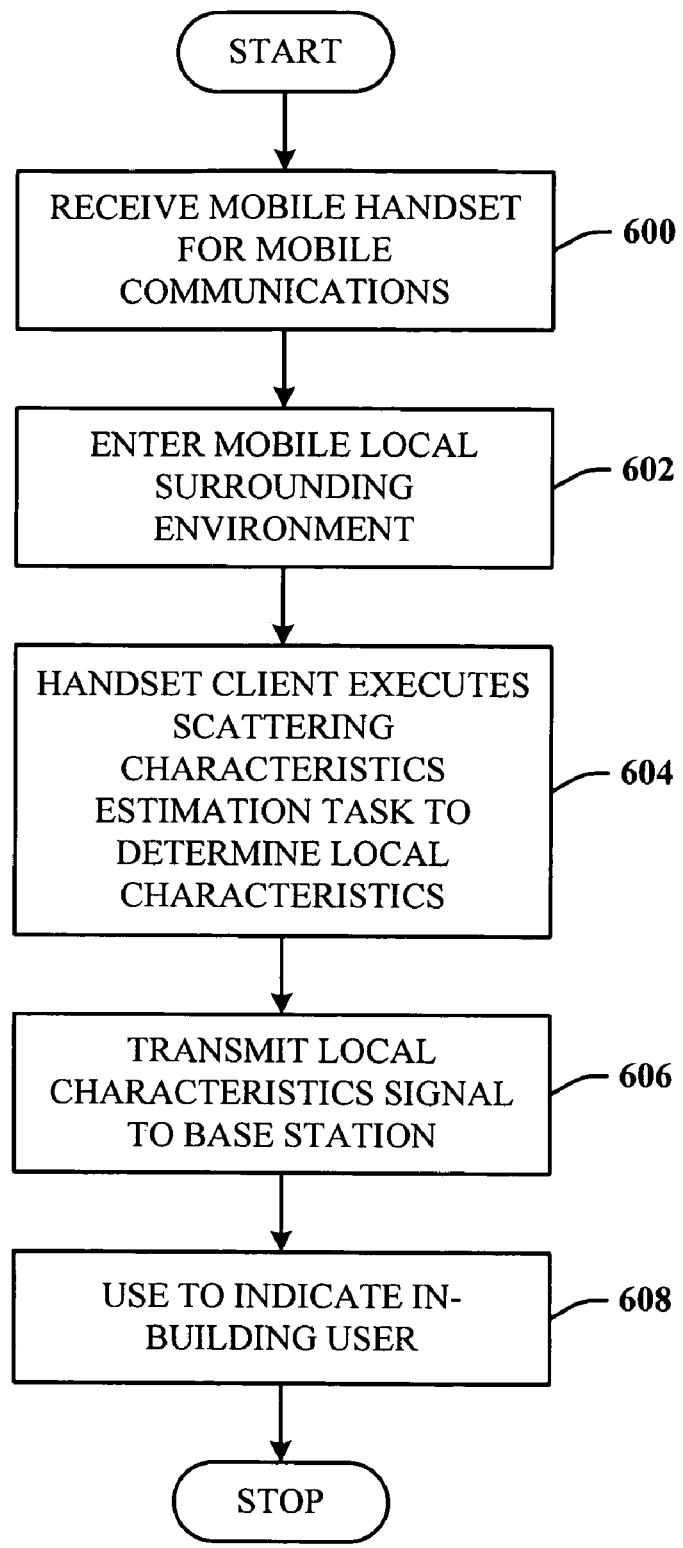
FIG. 6 illustrates a flow diagram of a methodology of determining if a handset is indoors according to an aspect.

FIG. 6 illustrates a flow diagram of a methodology of determining if a handset is indoors according to an aspect. At 600, a mobile handset is received with a client that facilitates estimation of radio propagation characteristics. At 602, the handset enters the local environment. At 604, the handset client executes a scattering characteristics estimation task that determines local radio propagation characteristics. At 606, the characteristics data is transmitted to the base station. At 608, once communications is established or the user handset can be identified, the location of the user can be determined as either indoors (in-building) or outdoors.

Figure 7:
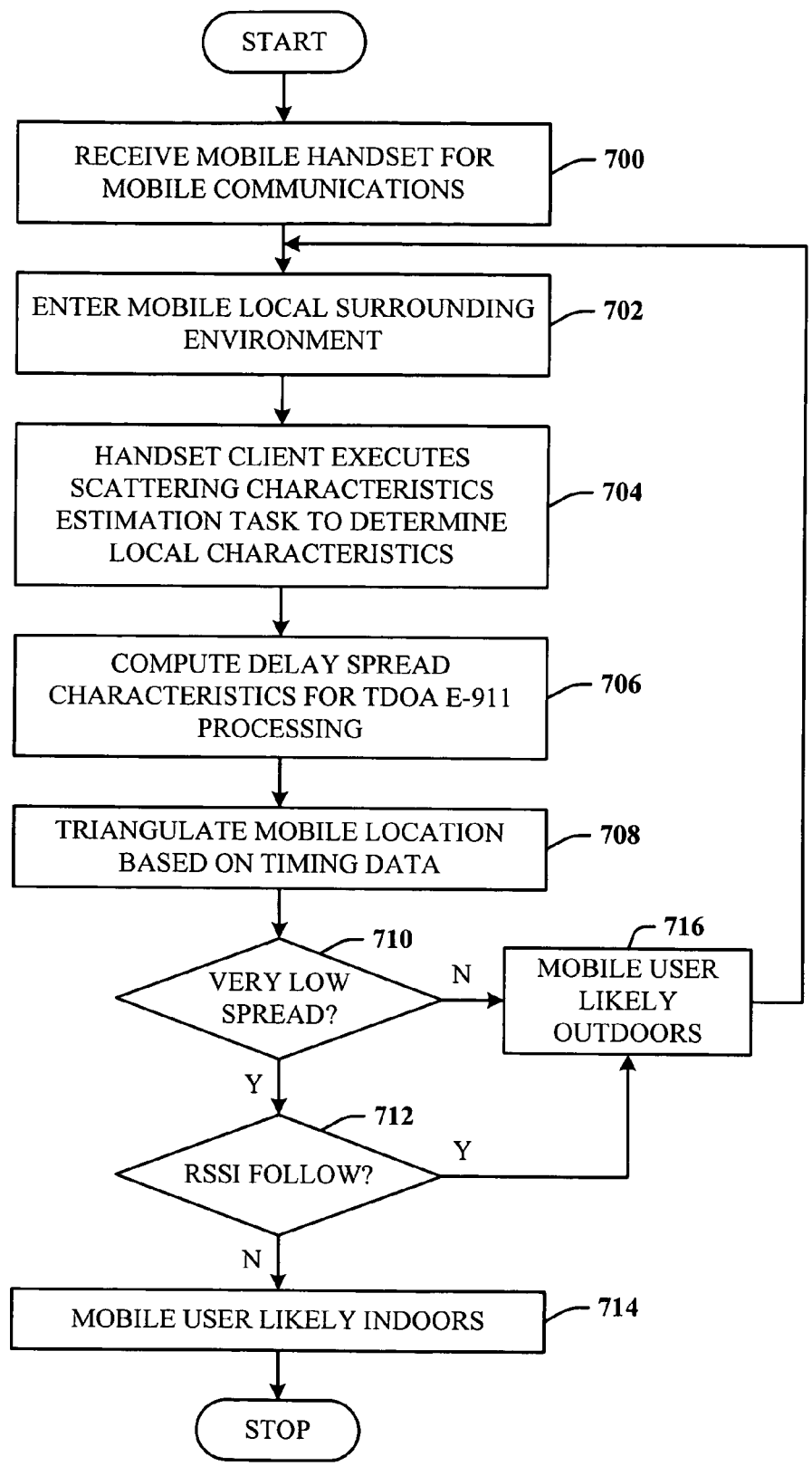
FIG. 7 illustrates a flow diagram of a methodology of utilizing delay spread to determine if a handset user is indoors according to an aspect.

FIG. 7 illustrates a flow diagram of a methodology of utilizing delay spread to determine if a handset user is indoors according to an aspect. At 700, a mobile handset with a client is received. At 702, the user enters a local mobile environment with the handset. At 704, the handset client executes a scattering characteristics estimation task to determine the local mobile environment characteristics. At 706, delay spread characteristics are computed to TDOA (time difference of arrival) for E-911 location processing. At 708, one method of TDOA determination can employ triangulation of the location of the mobile handset based on timing data. At 710, the system determines of the handset indicates very low spread characteristics. At 712, the system also determines if the RSSI (received signal strength indication) from several base stations does not follow a pathloss-distance relationship. If at 710, the handset indicates a very low spread and at 712, the RSSI does not follow, the user is most likely indoors, as indicated at 714. In any other case, for example, the spread is not low, or the spread is low but the RSSI follows, it is most likely that the user handset is outside of the structure, as indicated at 716. The interference caused by ping signal is minimal or nonexistent when transmitted at very low power. The reason for low power is due to interest only in local environments of mobile handset. Since the ping signal is generated periodically or on-demand, this further reduces interference and the impact on resources.

Figure 8:
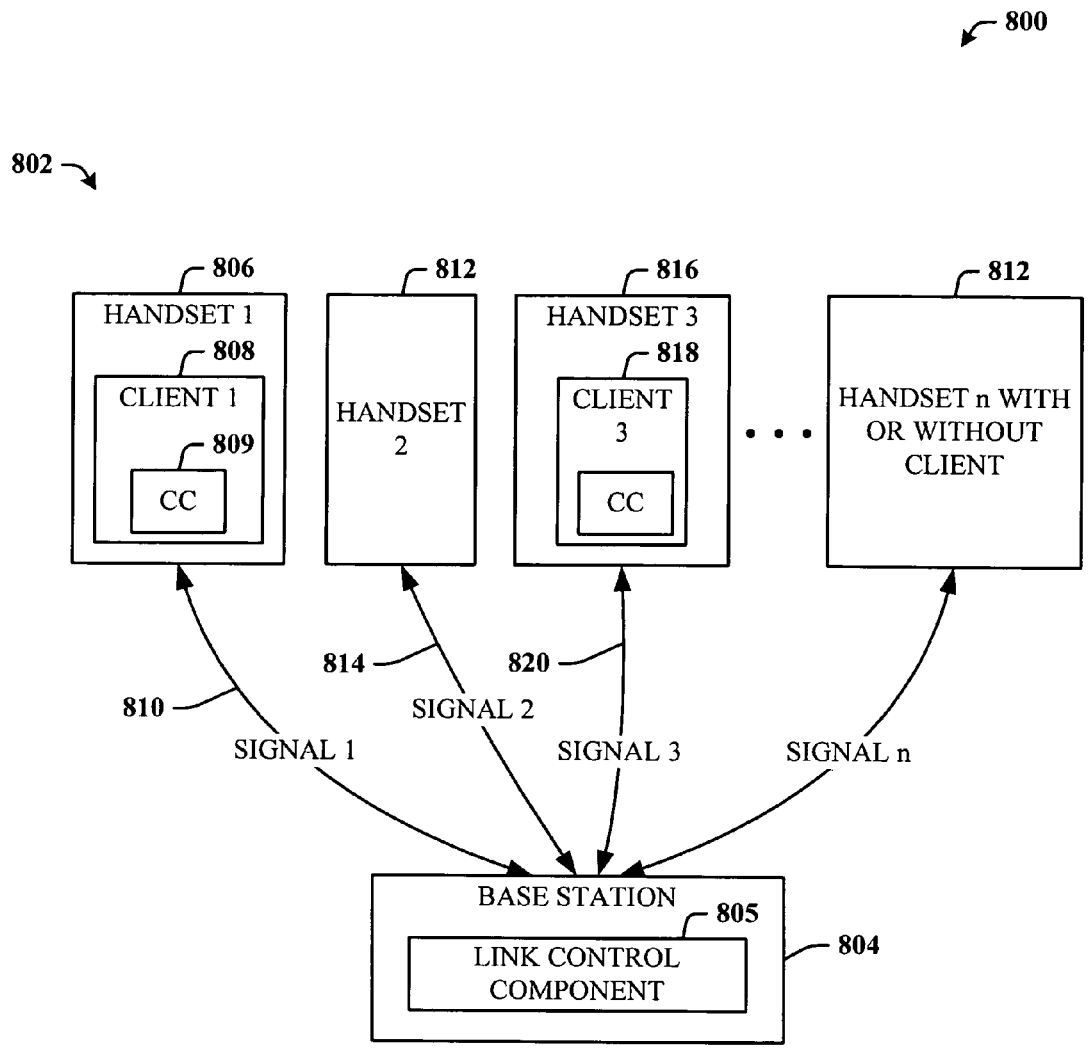
FIG. 8 illustrates a system of multiple handsets interacting in a local environment for the adjustment of radio propagation characteristics.

FIG. 8 illustrates a system 800 of multiple handsets 802 interacting in a local environment for the adjustment of radio propagation characteristics. The environment includes a base station 804 that functions at least to adjust link performance for one or more of the handsets 802 (denoted HANDSET1, HANDSET2, . . . , HANDSETn, where n is an integer) by further including a link control component 805 (similar to link control component 104 of FIG. 1). At least one of the handsets 802 can include a client that facilitates execution of a task for estimation of environment radio propagation characteristics. For example, a first handset 806 includes a client 808 that initiates an estimation task once entering the environment of the base station 806 via a channel component 809 (denoted CC, and similar to channel component 102 of FIG. 1). Again, initiation can be on-demand based upon a registration request of the handset, for example. When the handset client 808 completes computation of the estimated environment characteristics data, the client 808 transmits the data to the base station 804, whereafter the base station 804 processes the data and adjusts a link 810 to the first handset 806 to enhance communications therebetween.

When a second handset 812 enters the local base station environment, the second handset does not include a client, such that link performance cannot be adjusted based on characteristics data derived from the second client 812. Thus, the base station 804 can automatically provide the same link performance power level, for example, to the second client 812 as the first client 806, as a way of attempting to provide adequate communications for the second handset 812 via a signal link 814.

When a third handset 816 having a second client 818 enters the base station environment, the second client 818 initiates an estimation task, and once the characteristics for its location have been determined, the handset transmits the characteristics data to the base station 804. The base station 804 processes the characteristics data of the third handset and, in one implementation, adjusts only the link performance for the third handset. Thus, link performance can be adjusted on a handset-by-handset basis. In another implementation, the base station 804 reprocesses all of the existing characteristics data from all handsets (e.g., handsets 806 and 812), and adjusts the link for each handset (e.g., link signal 810 and 814) according to the optimum results for all handsets. These same link performance processes can be employed for the other handsets and clients that enter the local base station environment.

Figure 9:
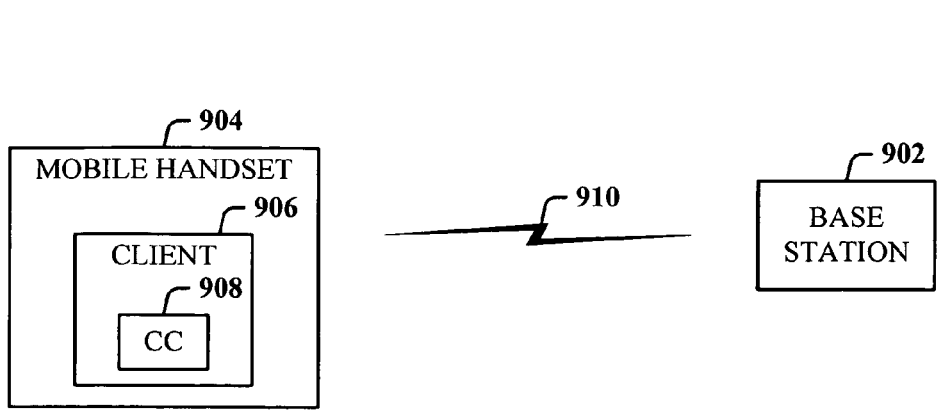
FIG. 9 illustrates a typical handset/client implementation with a base station.

Typically, the mobile handset clients (e.g., 808 and 818) are designed for gathering and characterizing environment information and the base station 804 is designed for adjusting the link settings based on the characterizing information. FIG. 9 illustrates a typical handset/client implementation 900 with a base station 902. Here, a handset 904 includes a client 906 which further can include a channel component 908. The handset 904 communicates with the base station 902 via a link 910 to pass estimated environmental radio propagation characteristics data to the base station 902, in response to which the base station 902 enhances the link 910 therebetween for optimum radio performance.

Figure 10:
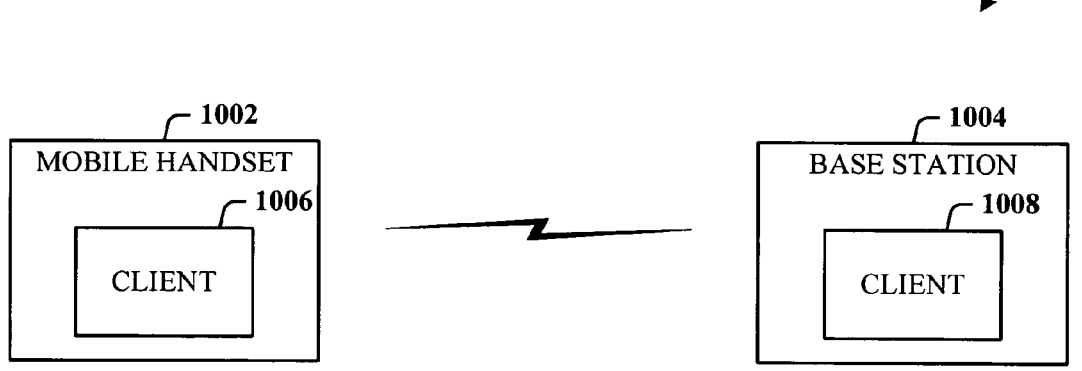
FIG. 10 illustrates a system where both a handset and a base station include clients for optimum radio link performance.

Alternatively, the responsibilities of the mobile handset clients and base station are interchangeable, at least in part. FIG. 10 illustrates a system 1000 where both a handset 1002 and a base station 1004 include clients 1006 and 1008, respectively, for optimum radio link performance. The client need not be the same in functionality. For example, the base station 1004 can assist the handset client 1006 with characterizing the local environment using stored functions and/or information. In other words, the handset client 1006 can perform some of the estimation computations and the handset 1002 can pass other portions of the computation off to the base station to assist in arriving at the estimated environment characteristics data.

In another implementation, the handset client 1006 can include the capability to control the client 1008 of the base station 1004 such that once the estimated characteristics data is determined by the handset client 1006, the handset client instructs the base station client 1008 to adjust the link performance, rather than the base station client performing this autonomously, as described supra.

Figure 11:
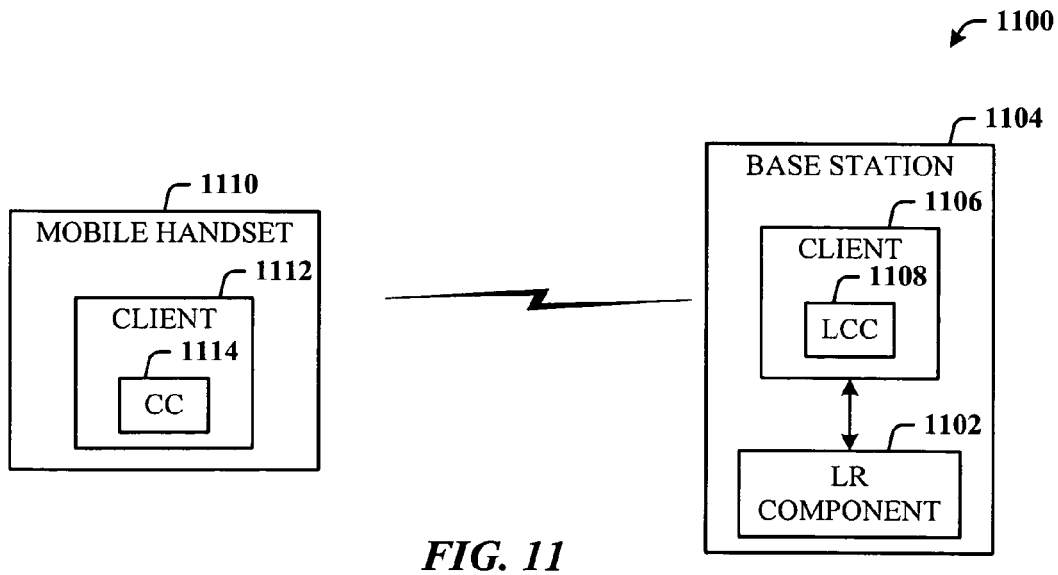
FIG. 11 illustrates a system that employs a learning and reasoning component in a base station to automate one or more attributes of the estimation and link enhancement process.

The system can forego characterization of the local environment where the base station is suitably designed to automatically adjust the link settings according to a pattern or intelligent guess upon registration of a mobile client. FIG. 11 illustrates a system 1100 that employs a learning and reasoning component 1102 (denoted LR COMPONENT) in a base station 1104 to automate one or more attributes of the estimation and link enhancement process. The LR component 1102 can interface to a base station client 1106, which base station client 1106 can also include a link control component 1108 (denoted LCC) for link performance adjustment. A handset 1110 includes a handset client 1112, which further can include a channel component 1114.

In operation, the LR component 1102 can learn and reason over time about many different aspects of the handset/base station relationship. For example, if a particular handset repeatedly enters the environment, as detected by the base station, over a period of time, the LR component 1102 can automatically set the link performance for that client to a predetermined level, since such environmental estimation data has already been computed many times before for this handset, and at various locations within the environment. Thus, to save time, once the handset registers, data stored in association with the handset can indicate to what power level, for example, the link channel should be set.

The subject invention can employ various learning and reasoning-based schemes for carrying out various aspects thereof. For example, a process for determining at what power level a channel link signal should be adjusted can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions, including by example, but not by limitation, determining according to a predetermined criteria when to initiate task estimation of the local environment, at what power levels all links should be adjusted, at what power level an individual link should be adjusted, when to initiate on-demand environmental characterization, when to employ coordinated handset/base station processing, and so on. The LR component 1102 can also determine to what counter value a counter should be set to optimize environmental link performance for a given handset, or whether the handset should initiate on-demand task processing.

Figure 12:
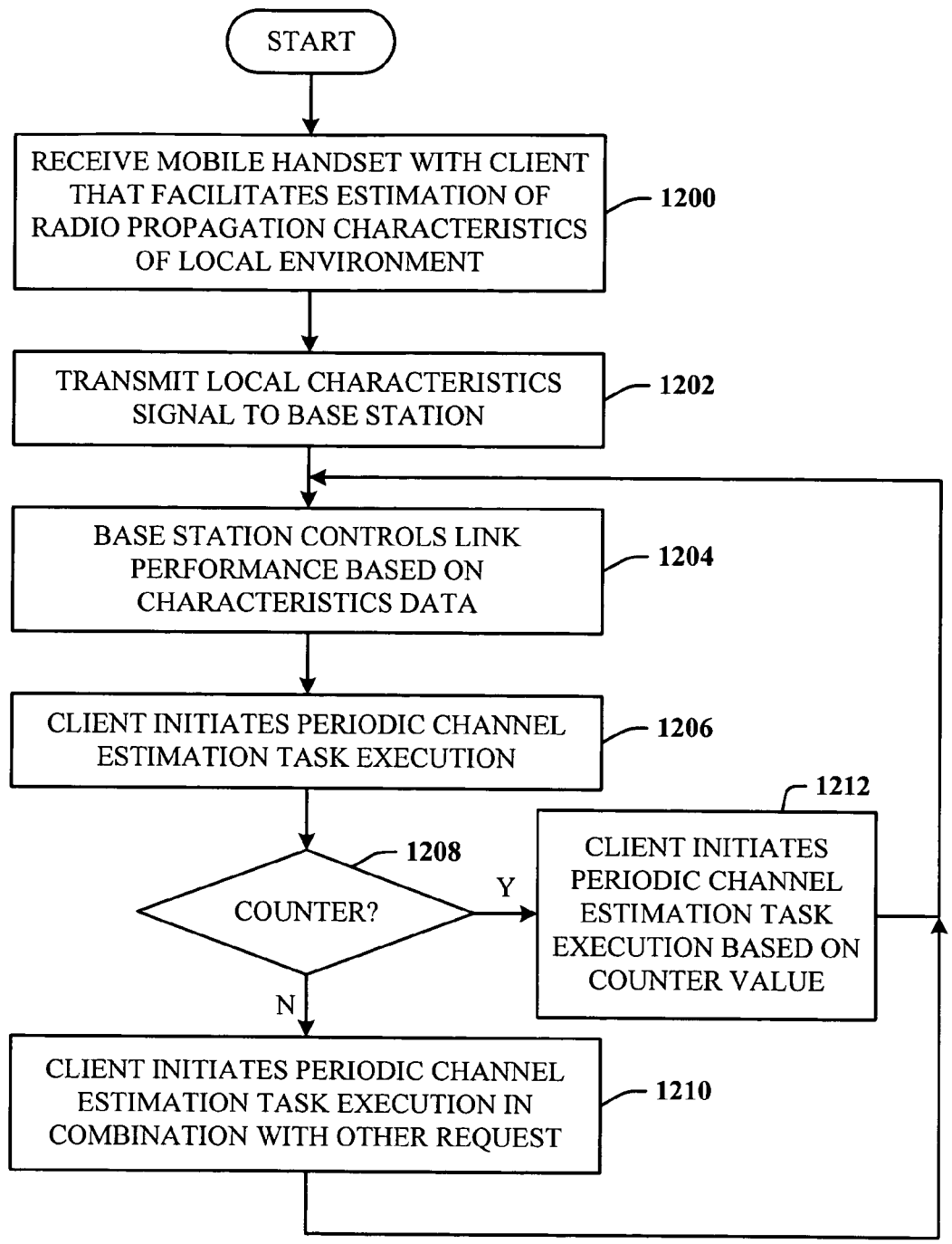
FIG. 12 illustrates a methodology of performing periodic environment estimation according to an aspect of the invention.

FIG. 12 illustrates a methodology of performing periodic environment estimation according to an aspect of the invention. At 1200, a handset is received that includes a client that can estimate radio propagation characteristics data of a local base station environment. At 1202, once computed by the handset, the handset transmits the data to the base station. At 1204, the base station processes the data and controls link performance accordingly. At 1206, the handset client initiates periodic task estimation of the environment data. At 1208, the handset client determines if counter-type execution should be employed. If not, at 1210, the handset client initiates periodic estimation task execution in combination with other requests. Alternatively, if a counter value is selected initiate task execution, flow is from 1208 to 1212 where the handset client initiates periodic channel estimation execution based on a predetermined counter value. Flow can then be back to 1204 where the base station controls the link performance.

Figure 13:
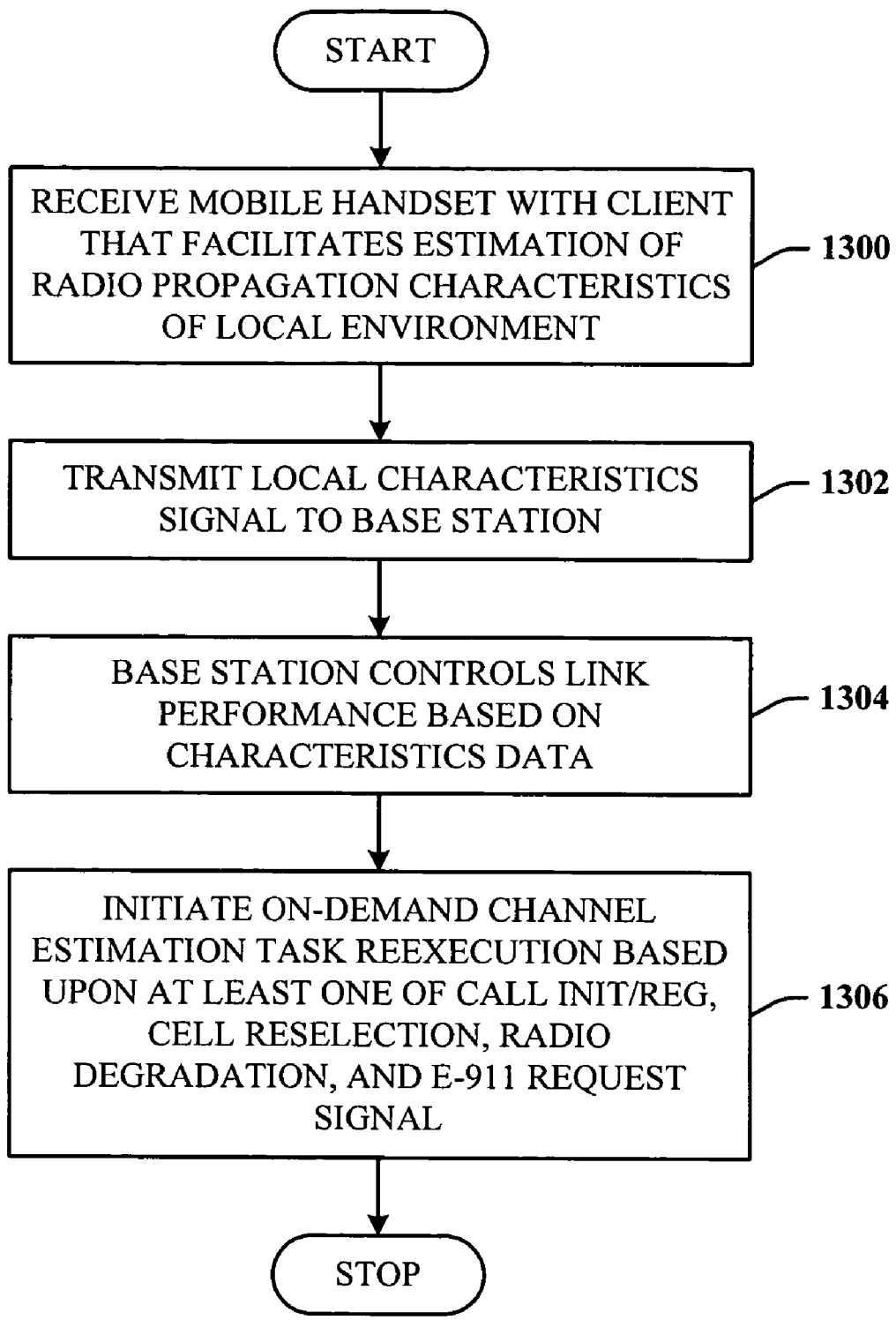
FIG. 13 illustrates a methodology of performing on-demand environment estimation according to an aspect of the invention.

FIG. 13 illustrates a methodology of performing on-demand environment estimation according to an aspect of the invention. At 1300, a handset is received that includes a client that can estimate radio propagation characteristics data of a local base station environment. At 1302, once computed by the handset, the handset transmits the data to the base station. At 1304, the base station processes the data and controls link performance accordingly. At 1306, the handset client initiates on-demand task re-estimation of the environment data. This can be based upon at least one of call initialization/registration, cell reselection (handset roams from one cell to another), radio link degradation, and an E-911 location request signal, for example.

Figure 14:
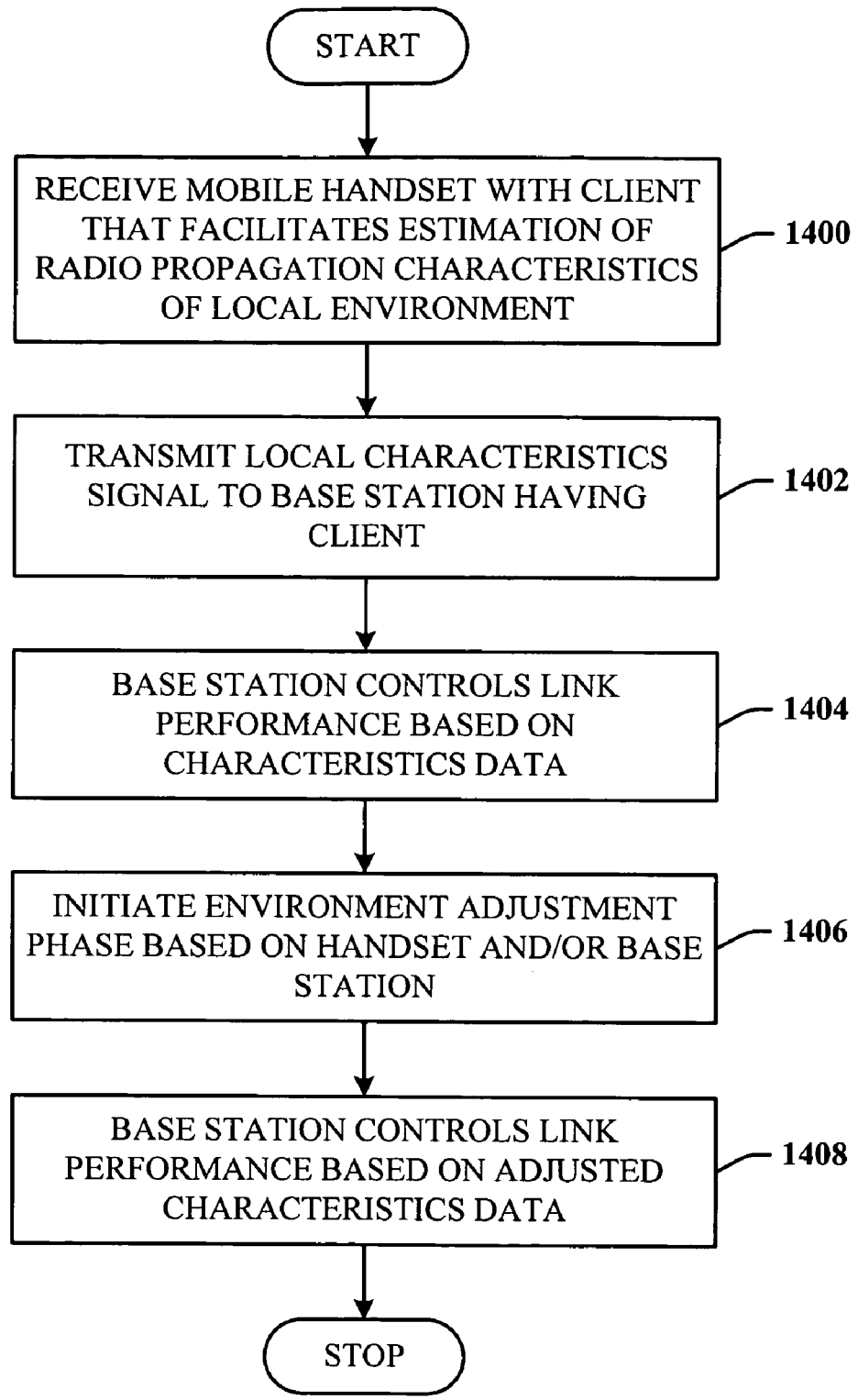
FIG. 14 illustrates a methodology of performing environment re-estimation by the handset and/or base station according to an aspect of the invention.

FIG. 14 illustrates a methodology of performing environment re-estimation by the handset and/or base station according to an aspect of the invention. At 1400, a handset is received that includes a client that can estimate radio propagation characteristics data of a local base station environment. At 1402, once computed by the handset, the handset transmits the data to the base station. At 1404, the base station processes the data and controls link performance accordingly. At 1406, the environmental re-estimation phase is initiated by either or both of the handset or/and the base station. At 1408, the base station control link performance based upon the adjusted characteristics data.

Figure 15:
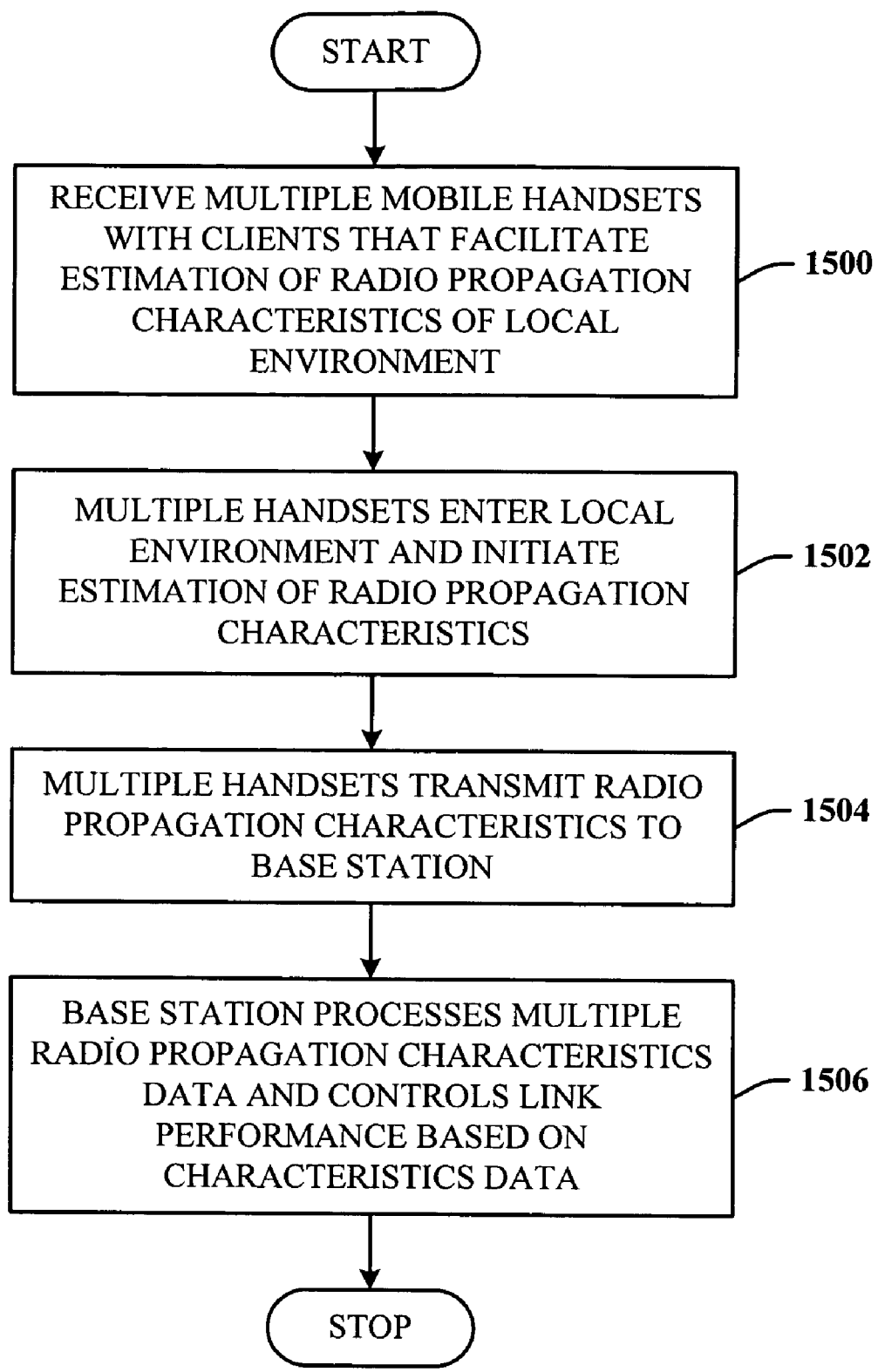
FIG. 15 illustrates a methodology of performing environment estimation according to a plurality of mobile handsets that enter a base station environment.

FIG. 15 illustrates a methodology of performing environment estimation according to a plurality of mobile handsets that enter a base station environment. At 1500, multiple handsets are received that include clients which can estimate radio propagation characteristics data of a local base station environment. At 1502, when the handsets enter the environment, each handset performs estimation of the radio propagation characteristics for itself based on its location in the environment. At 1504, once computed by the handsets, the handsets transmit the data to the base station. At 1506, the base station processes the data and controls link performance for all handsets accordingly. Alternatively, as described supra, the base station can also adjust link performance separately for each handset channel, thereby providing customized link adjustment for each handset. This can also be performed as the handset moves throughout the environment.

Figure 16:
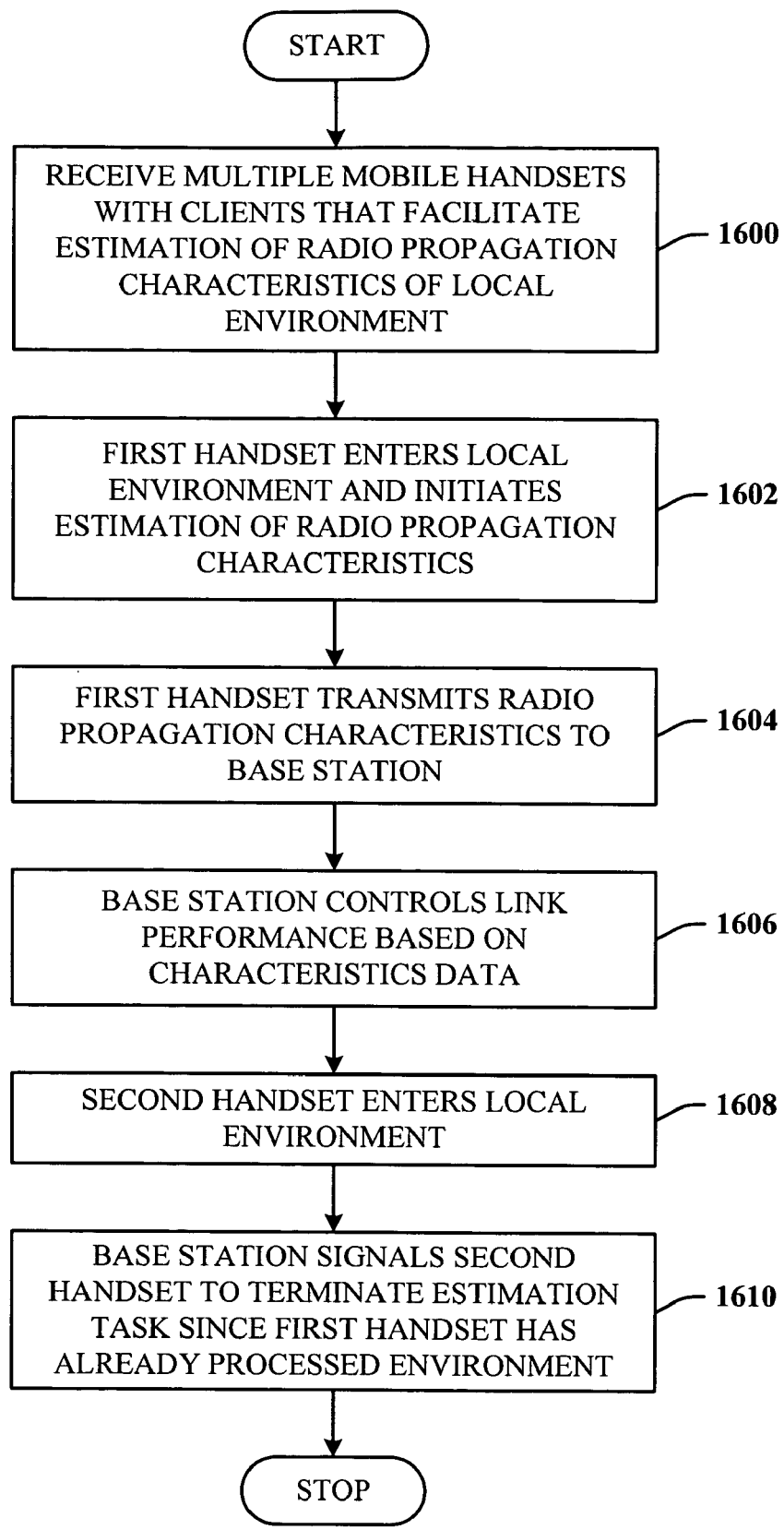
FIG. 16 illustrates an alternative methodology of performing environment estimation according to a plurality of mobile handsets that enter a base station environment.

FIG. 16 illustrates an alternative methodology of performing environment estimation according to a plurality of mobile handsets that enter a base station environment. At 1600, multiple handsets are received that include clients which can estimate radio propagation characteristics data of a local base station environment. At 1602, a first handset enters the base station environment and initiates estimation of the radio propagation characteristics for itself at a location. At 1604, the first handset transmits the characteristics data to the base station. At 1606, the base station control link performance of the first handset based on the characteristics data. At 1608, a second handset enters the base station environment. At 1610, the base station signals the second handset to not initiate environment estimation since it has already been derived by the first handset. The second handset will then operate under the link control applied to the first handset. It is to be appreciated that thereafter, if the second handset fails to adequately communicate, the second handset can automatically initiate estimation of the environment for itself to ensure adequate communications based on its location and handset attributes.

Figure 17:
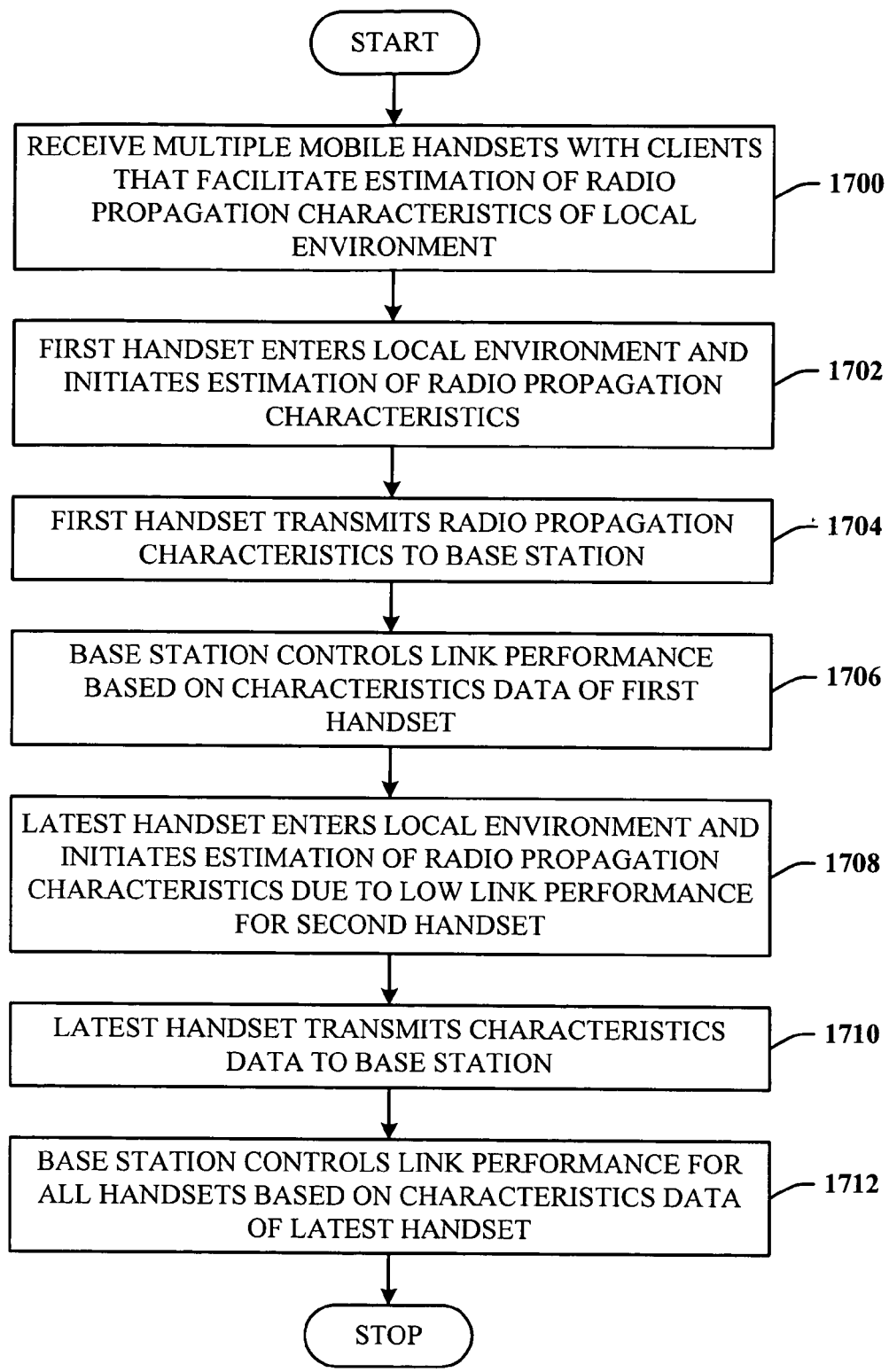
FIG. 17 illustrates a methodology of controlling environment link performance based on a mobile handset that is the latest to enter a base station environment.

FIG. 17 illustrates a methodology of controlling environment link performance based on a mobile handset that is the latest to enter a base station environment. At 1700, multiple handsets are received that include clients which can estimate radio propagation characteristics data of a local base station environment. At 1702, a first handset enters the base station environment and initiates estimation of the radio propagation characteristics for itself at a location. At 1704, the first handset transmits radio propagation characteristics data to the base station. At 1706, the base station processes the data and controls the link performance for the first handset. At 1708, a second (or latest) handset enters the base station environment, and estimates that radio link performance is degraded due to low link performance for itself. At 1710, the latest (or second) handset transmits its characteristics data to the base station. The base station then processes the data and adjusts link performance for all handsets of the local environment based on the latest characteristics data, as indicated at 1712.

Figure 18:
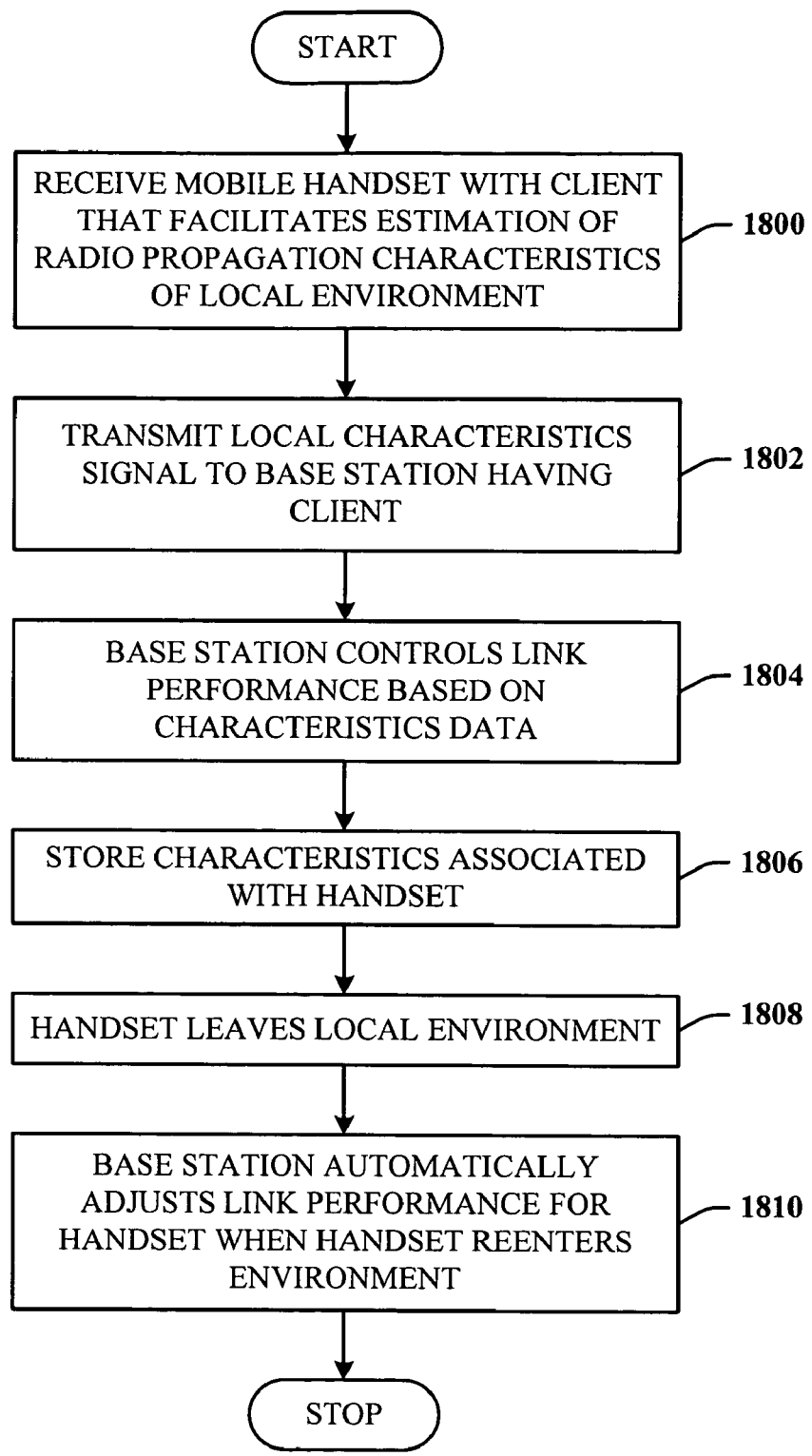
FIG. 18 illustrates a methodology of controlling environment link performance based on a mobile handset previously generated characteristics data and then re-enters the base station environment.

FIG. 18 illustrates a methodology of controlling environment link performance based on a mobile handset previously generated characteristics data and then re-enters the base station environment. At 1800, a handset is received that includes a client that can estimate radio propagation characteristics data of a local base station environment. At 1802, once computed by the handset, the handset transmits the data to the base station. At 1804, the base station processes the data and controls link performance accordingly. At 1806, the data as generated by the client is stored for later access. At 1808, the handset leaves the environment. At 1810, the handset re-enters the environment, at which time the previous data is accessed, and the base station automatically adjusts the link performance based on the previously stored data associated with the handset.

Figure 19:
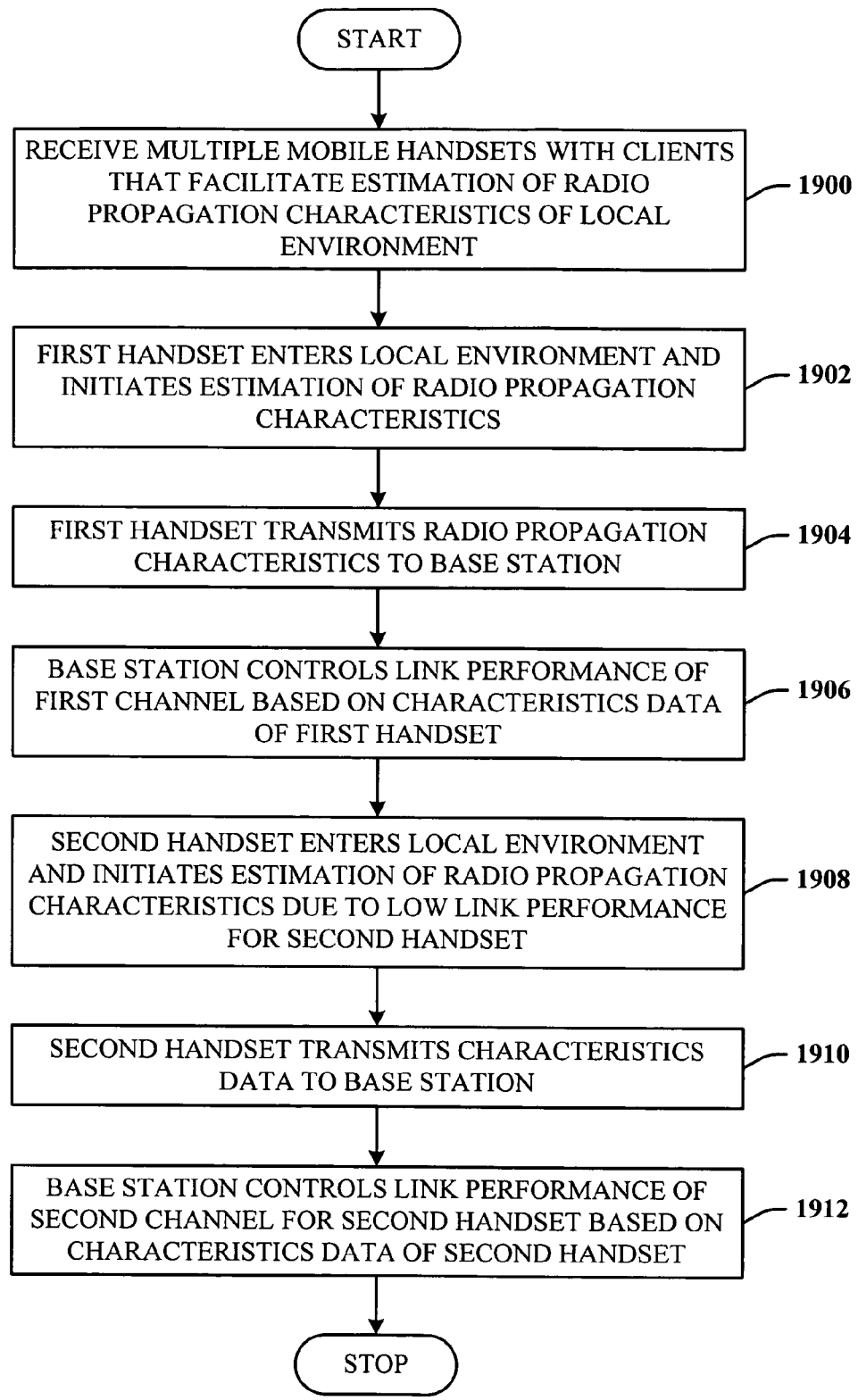
FIG. 19 illustrates a methodology of controlling link performance individually for each handset.

FIG. 19 illustrates a methodology of controlling link performance individually for each handset. At 1900, multiple handsets are received that include clients which can estimate radio propagation characteristics data of a local base station environment. At 1902, a first handset enters the base station environment and initiates estimation of the radio propagation characteristics for itself at a location. At 1904, the first handset transmits radio propagation characteristics data to the base station. At 1906, the base station processes the data and controls the link performance of a first channel for the first handset. At 1908, a second handset enters the base station environment, and estimates that radio link performance is degraded due to low link performance for itself. At 1910, the latest handset transmits its characteristics data to the base station. The base station then processes the data and adjusts link performance of the second channel for the second handset based on the second handset characteristics data, as indicated at 1912.

Figure 20:
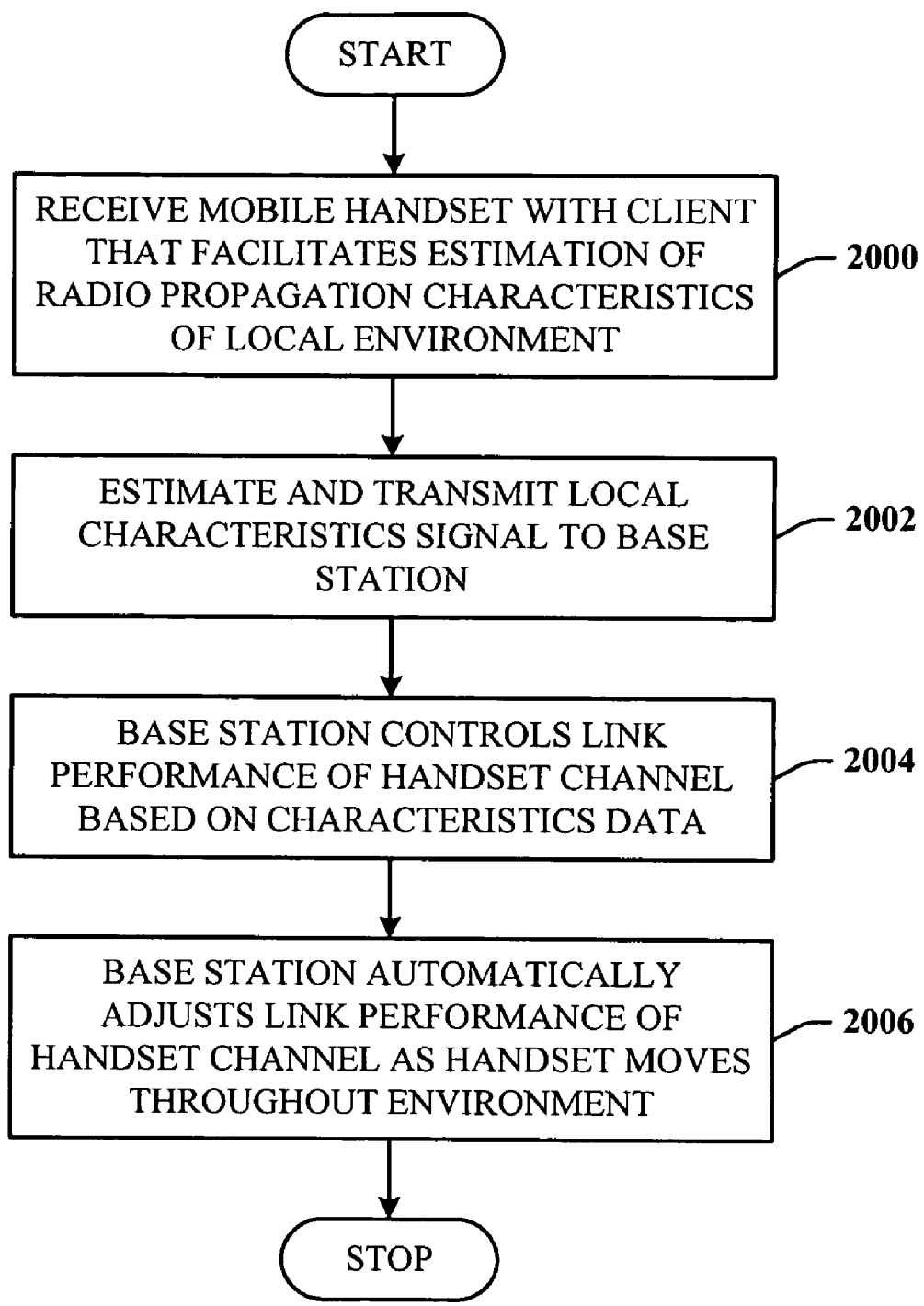
FIG. 20 illustrates a methodology of controlling environment link performance of a handset as the handset moves throughout the base station environment.

FIG. 20 illustrates a methodology of controlling environment link performance of a handset as the handset moves throughout the base station environment. At 2000, a handset is received that includes a client that can estimate radio propagation characteristics data of a local base station environment. At 2002, once computed by the handset, the handset transmits the data to the base station. At 2004, the base station processes the data and controls link performance accordingly. At 2006, the base station automatically adjusts link performance of the handset channel as the handset moves throughout the environment.

Figure 21:
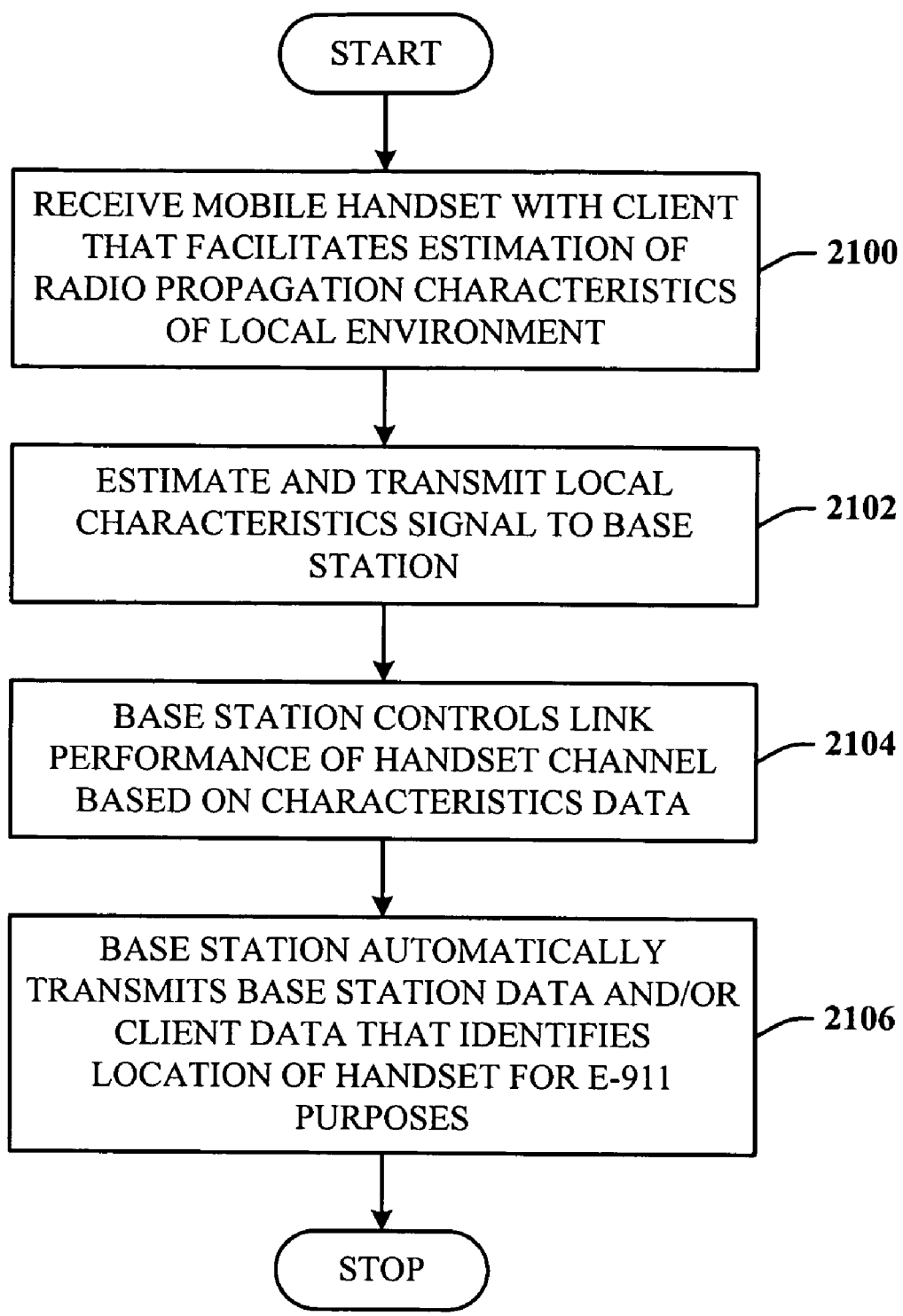
FIG. 21 illustrates a methodology of providing E-911 location service of a handset.

FIG. 21 illustrates a methodology of providing E-911 location service of a handset. At 2100, a handset is received that includes a client that can estimate radio propagation characteristics data of a local base station environment. At 2102, once computed by the handset, the handset transmits the data to the base station. At 2104, the base station processes the data and controls link performance accordingly. At 2106, the base station automatically transmits base station data and/or client data that identifies a location of the base station and/or handset for E-911 location purposes.

Figure 22:
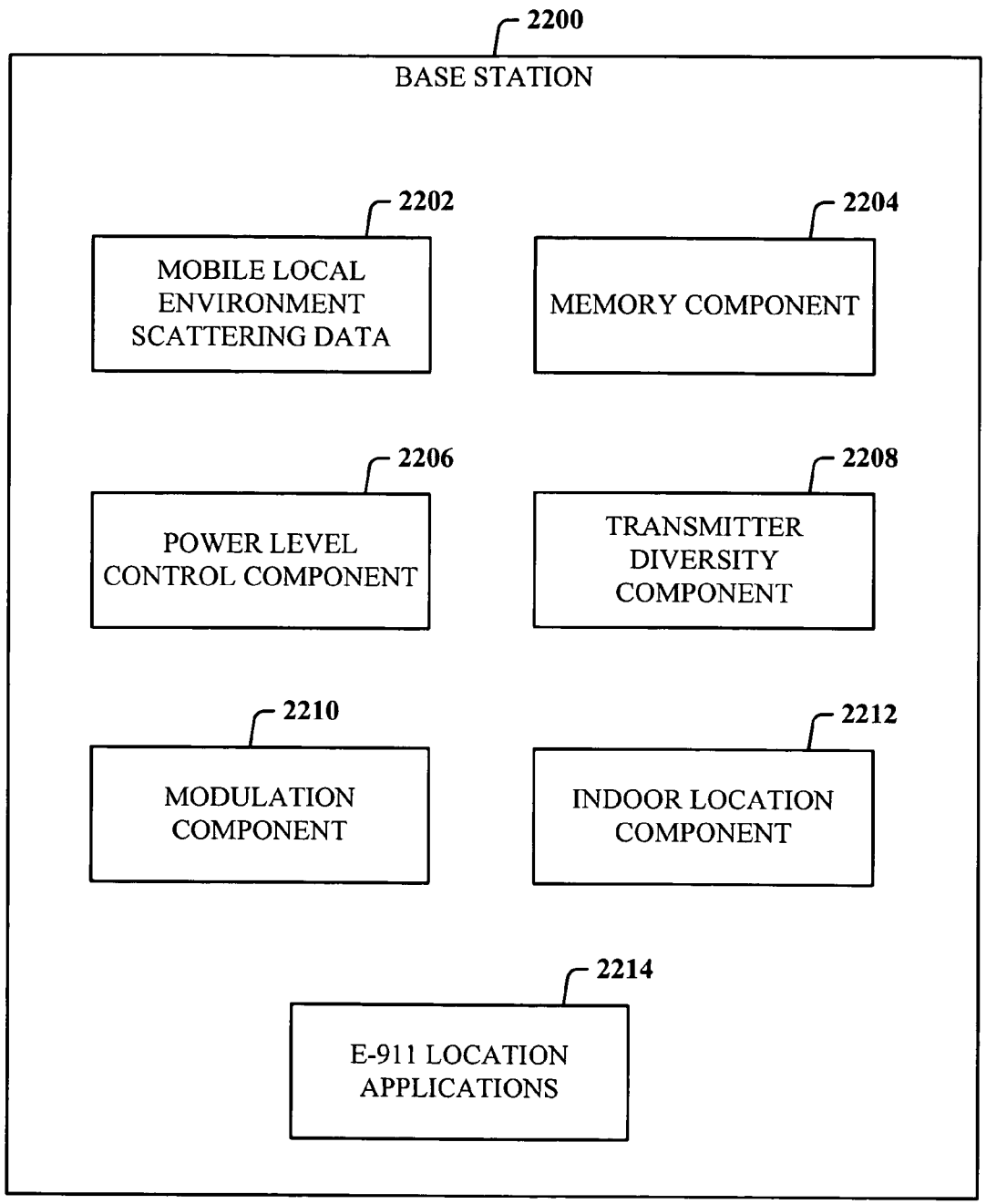
FIG. 22 illustrates a generalized diagram of a base station capabilities described herein in accordance with an aspect of the invention.

FIG. 22 illustrates a generalized diagram of a base station 2200 capabilities described herein in accordance with an aspect of the invention. The base station 2200 comprises received mobile local scattering environment information 2202, memory storage 2204 at least for registered mobile clients, link control component 2206 logic and circuitry that facilitates adjustment a link (e.g., power level), a transmitter diversity component 2208 that facilitates processing multi-transmitter data for different transmitters, a modulation coding component 2210 that facilitates changing or adjusting modulation coding, and indoor location component 2212 that facilitates determination of user location and E-911 location applications 2214 that assist in E-911 location processing.

The base station 2200 can be stationary or a mobile device. Mobile local scattering environment information 2202 is received, at least in part, from the channel component of a handset, and additionally, can include delay spread characteristics data and AOA data. Information on each registered mobile client can be stored in the memory 2204 for future instances where a device enters the same environment. The base station 2200 adjusts itself to enhance link performance by adjusting any combination of the power level, transmitter diversity, and modulation coding scheme. The enhanced link performance enables the system to identify an indoor location of a user with minimal interference because the ping signal is transmitted at a low power level. The base station also assists in E-911 location applications by identifying information relating to location, request, urgency, and/or whether a repeater is used.

Figure 23:
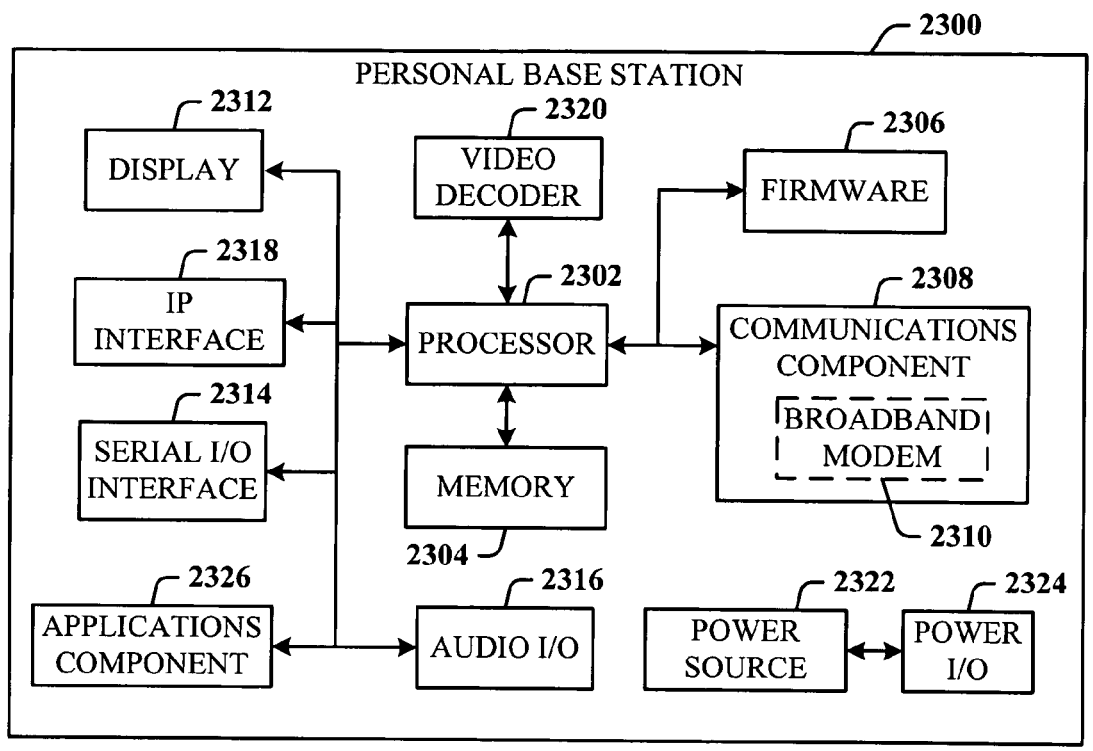
FIG. 23 illustrates a more detailed schematic diagram of a base station that operates in accordance with the subject invention.

FIG. 23 illustrates a more detailed schematic diagram of a base station 2300 that operates in accordance with the subject invention. The base station 2300 includes a processor 2302 for controlling and processing all onboard operations and functions. A memory 2304 interfaces to the processor 2302 for the storage of data and one or more applications stored in firmware 2306 and being executed by the processor 2302. The memory 2304 can include mass storage capability such that the base station 2300 can stored the multimedia content in addition to transmitting the content therefrom. This further includes storing telephone messages received over the PSTN (public switched telephone network), as well as VoIP signals communicated over the digital IP network.

The firmware 2306 can also store startup code for execution in initializing the base station 2300. A communications component 2308 interfaces to the processor 2302 to facilitate wired/wireless communications with external systems. In another implementation, the communications component 2308 can include a broadband modem 2310 such that the PBS 2300 includes the capability to interface directly to a broadband network to accommodate IP traffic, forgoing the need to further interface to an external broadband modem, router, or other suitably comparable IP communication device.

The base station 2300 can also include a display 2312 for displaying text and graphics related to telephony functions, for example, a Caller ID function and a setup function. A serial I/O interface 2314 is provided in communication with the processor 2302 to facilitate serial communication (e.g., USB, and/or IEEE 1394) via a hardwire connection. This supports updating and troubleshooting the base station 2300, for example. Audio capabilities are provided with an audio I/O component 2316, which can include a speaker for the output of audio signals related to, for example, recorded data or telephony voice data, and a microphone for inputting voice signals for recording and/or telephone conversations.

In more robust implementations, the base station 2300 can include an IP interface 2318 for communicating IP traffic from the Internet via an ISP or cable provider. Thus, VoIP traffic can be utilized by the base station 2300, and IP-based multimedia content can be received in either an encoded or a decoded format. A video decoder 2320 can be provided for decoding encoded multimedia content. The base station 2300 also includes a power source 2322 in the form of batteries and/or an AC power subsystem, which power source 2322 can interface to an external power system or charging equipment (not shown) via a power I/O component 2324.

The base station 2300 can also include an applications component 2326 that provides the client, for example, and other applications in support of processing estimated local environment characteristics data received from a handset or other suitable mobile device or portable wireless device that hosts the client. For example, the applications component 2326 can include a modulation application that support changing the modulation scheme. Similarly, a power level application can be provided as part of the applications component 2326 that support processing scattering data, power level control for controlling link power levels, and E-911 location applications in support of locating a handset and its associated user indoors or outdoors. Additionally, the applications component 2326 can provide the learning and reasoning application that supports automating one or more functions based on learned aspects of the subject invention and local mobile environment.

Figure 24:
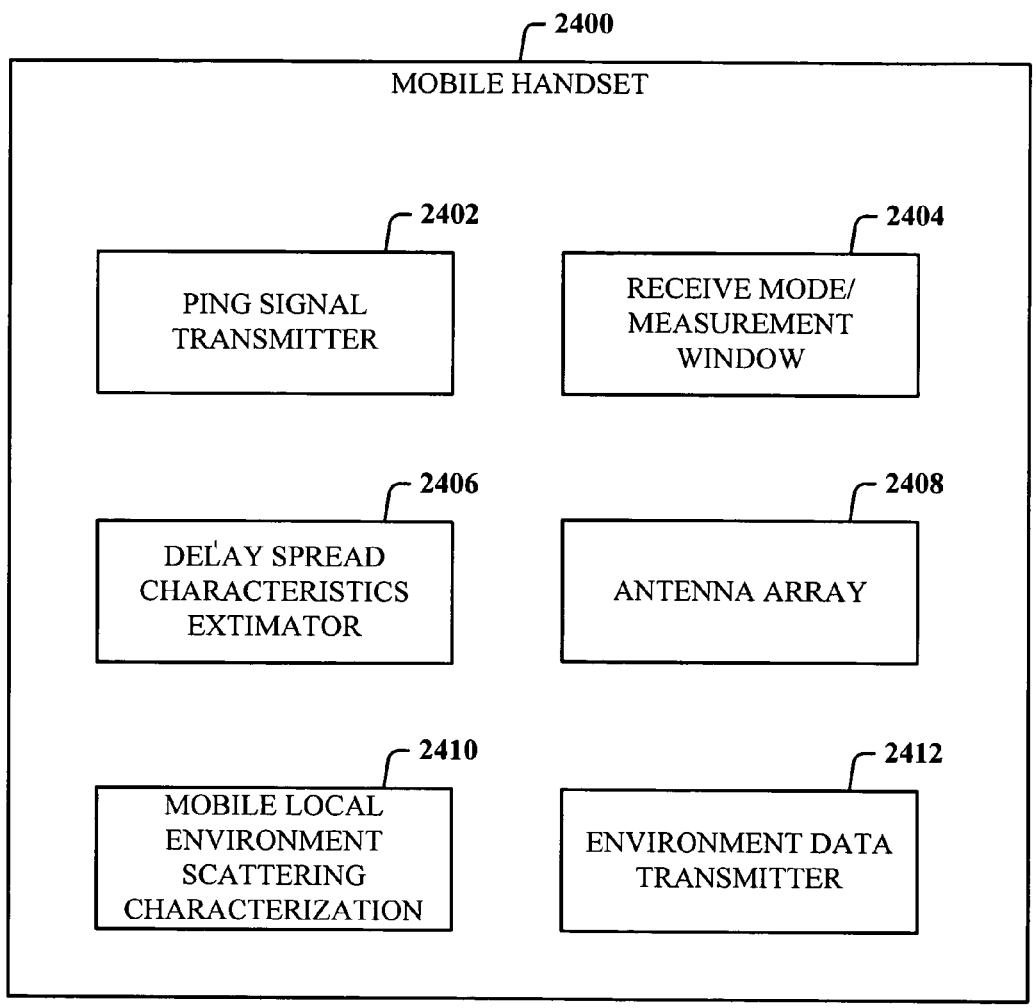
FIG. 24 illustrates a generalized diagram of a mobile client that can operate in accordance with an aspect of the invention.

FIG. 24 illustrates a generalized diagram of a mobile client that can operate in accordance with an aspect of the invention. The client 2400 comprises a ping signal transmitter 2402, a receive mode/measurement window component 2404, a delay spread characteristics estimator 2406, optionally, an antenna array 2408, a mobile local scattering environment characterization component 2410, and an environment information transmitter 2410.

The mobile client 2400 can be a part of a phone, vehicle, radio, or 2-way radio. The ping signal transmitter 2402 communicates ping signals at various power levels until sufficient energy is captured as provided the receive mode/measurement window component 2404. The measurement window 2404 can be set according to the RMS delay spread. When sufficient energy from the ping signals is captured, the mobile client 2400 utilizes the estimator 2406 to estimate the delay spread characteristics, and optionally, the antenna array 2408 to determine the AOA data. Based on these determinations, a computational tool can characterize the mobile local scattering environment so that a transmitter can transmit at least the environment information. Any component in the mobile client 2400 can be assisted by an outside source, such as a base station or another mobile client.

Figure 25:
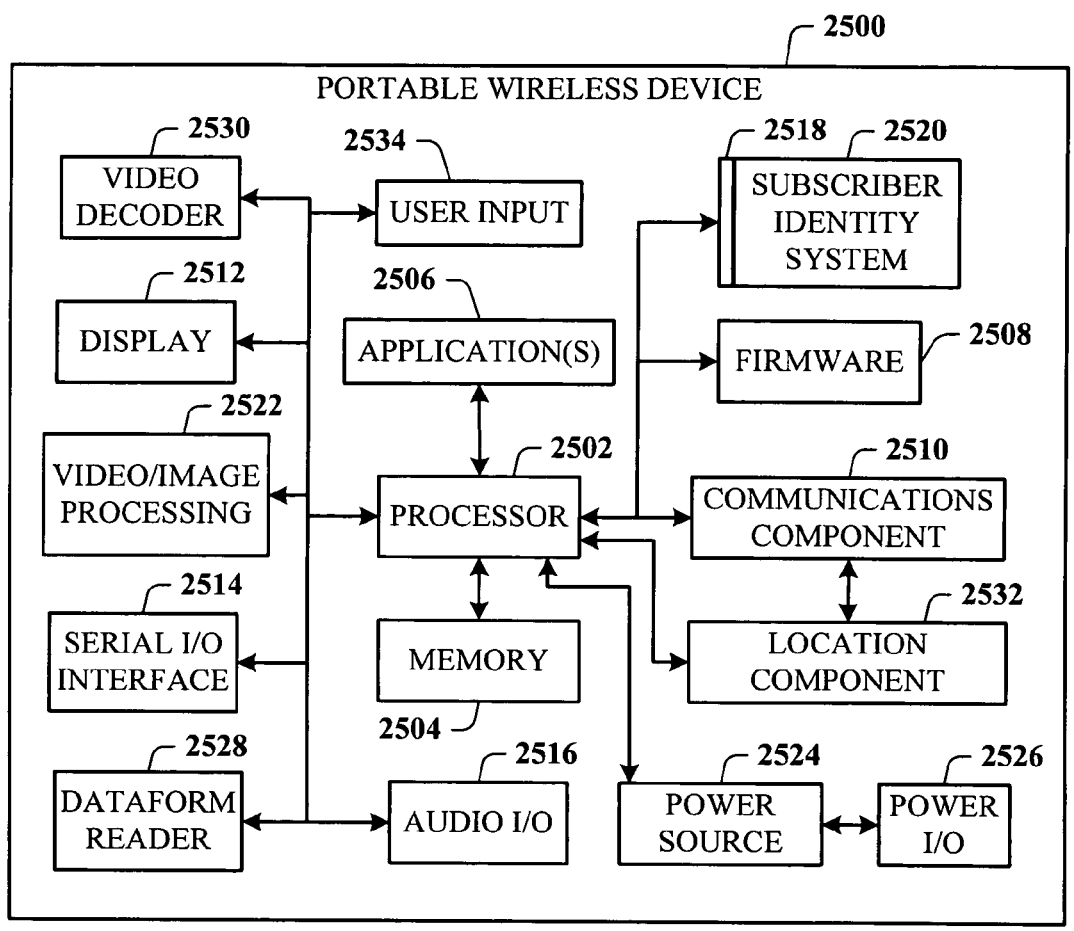
FIG. 25 illustrates a schematic block diagram of a mobile handset that operates in accordance with the subject invention.

FIG. 25 illustrates a more detailed schematic block diagram of a mobile handset that operates in accordance with the subject invention. The handset 2500 includes a processor 2502 for controlling and processing all onboard operations and functions. A memory 2504 interfaces to the processor 2502 for storage of data and one or more applications 2506 (e.g., a video player software, user feedback component software, etc.). The applications can include the client that provides estimation execution of a task for characterizing the local mobile environment and then transmitting the characterization data to the base station. Other applications can include voice recognition of predetermined voice commands that facilitate initiation of the user feedback signal.

The applications 2506 can be stored in the memory 2504 and/or in a firmware 2508, and executed by the processor 2502 from either or both the memory 2504 or/and the firmware 2508. Here, the application(s) 2506 can include the SSA and SAP architecture of the subject invention. The firmware 2508 also stores startup code for execution in initializing the handset 2500. A communications component 2510 interfaces to the processor 2502 to facilitate wired/wireless communications with external systems, e.g., cellular networks, VoIP networks, and so on. The handset 2500 includes devices such as a cellular telephone, a PDA with mobile communications capabilities, and messaging-centric devices.

The handset 2500 includes a display 2512 for displaying text, images, video, telephony functions (e.g., a Caller ID function), setup functions, and for user input. The display 2512 can also accommodate the presentation of multimedia content. A serial I/O interface 2514 is provided in communication with the processor 2502 to facilitate serial communication (e.g., USB, and/or IEEE 1394) via a hardwire connection, and other serial input devices (e.g., a keyboard, keypad, and mouse). This supports updating and troubleshooting the handset 2500, for example. Audio capabilities are provided with an audio I/O component 2516, which can include a speaker for the output of audio signals related to, for example, indication that the user pressed the proper key or key combination to initiate the user feedback signal. The audio I/O component 2516 also facilitates the input of audio signals via a microphone to record data and/or telephony voice data, and for inputting voice signals for telephone conversations.

The handset 2500 includes a slot interface 2518 for accommodating a SIS (subscriber identity system) module in the form factor of a card subscriber identity module (SIM) 2520, and interfacing the SIM card 2520 to the processor 2502. However, it is to be appreciated that the SIM card 2520 can be manufactured into the handset 2500, and updated by downloading data and software thereinto.

The handset 2500 can process IP data traffic via the communications component 2510 to accommodate IP traffic from an IP network such as, for example, the Internet, a corporate intranet, a home network, a person area network, etc., via an ISP or cable provider. Thus, VoIP traffic can be utilized by the handset 2500, and IP-based multimedia content can be received in either an encoded or a decoded format.

A video and/or imaging processing component 2522 (e.g., a camera) can be provided for decoding encoded multimedia content. The handset 2500 also includes a power source 2524 in the form of batteries and/or an AC power subsystem, which power source 2524 interfaces to an external power system or charging equipment (not shown) via a power I/O component 2526.

The handset 2500 can also include a dataform reader 2528 suitably designed to read many types of dataforms. For example, the reader 2528 can scan product bar codes of two and three dimensions, and other types of indicia.

The handset 2500 can also include a video decoder component 2530 for processing video content received and transmitted. A location tracking component 2532 facilitates geographically locating the handset 2500. As described hereinabove, this can occur when the user initiates the feedback signal automatically or manually.

A user input component 2534 facilitates the user initiating the quality feedback signal. The input component can include such conventional input device technologies such as a keypad, keyboard, mouse, stylus pen, and touch screen, for example.

Figure 26:
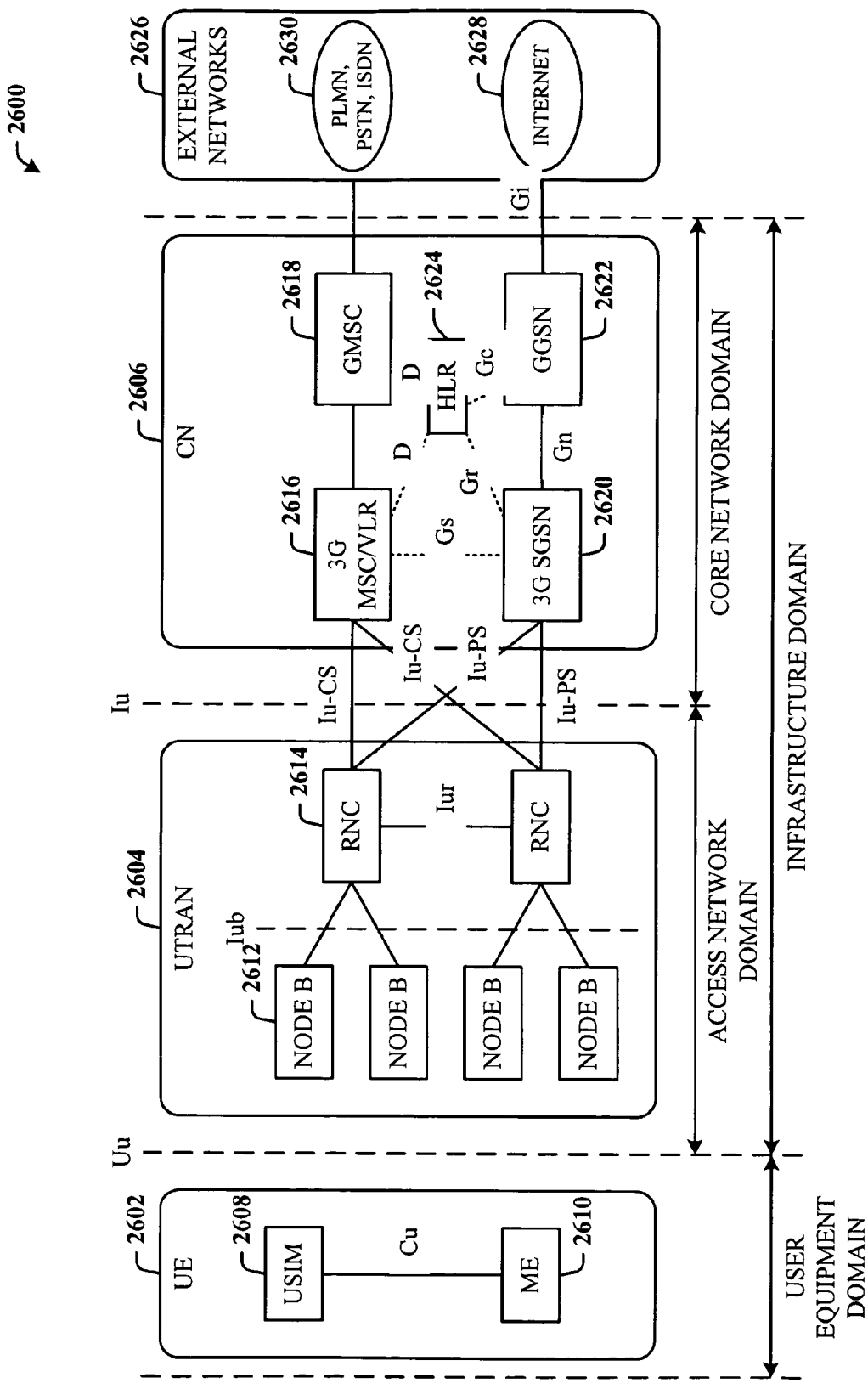
FIG. 26 illustrates an exemplary UMTS network that facilitates carrier management in accordance with the subject innovation.

FIG. 26 illustrates an exemplary UMTS network 2600 that facilitates carrier management in accordance with the subject innovation. The architecture is based on the 3GPP (Third Generation Partnership Project) Release 99 specification. However, it is to be understood that the subject innovation can be applied to any UMTS telecommunications architecture, including by way of example, Release 5 (R5) and, R5 and Release 6 (R6) 3GPP standards. UMTS offers teleservices (e.g., speech and/or SMS-Short Message Service) and bearer services, which provide the capability for information transfer between access points. Negotiation and renegotiation of the characteristics of a bearer service can be performed at session or connection establishment, and during an ongoing session or connection. Both connection oriented and connectionless services can be offered for point-to-point and point-to-multipoint communications.

The following frequencies 1885-2025 MHz and 2110-2200 MHz can be allocated for UMTS use. However, the innovative aspects described herein can also be applied to other frequency bands. Additionally, UMTS can be used in all cellular/PCS frequencies: for example, 825-849 MHz and 869-894 MHz; 1850-1910 MHz and 1930-1990 MHz. Bearer services can have different QoS (quality-of-service) parameters for maximum transfer delay, delay variation and bit error rate. Offered data rate targets are: 144 kbps satellite and rural outdoor; 384 kbps urban outdoor; and 2048 kbps indoor and low range outdoor.

UMTS network services can have different QoS classes for four types of traffic: conversational class (e.g., voice, video telephony, video gaming); streaming class (e.g., multimedia, video on demand, webcast); interactive class (e.g., web browsing, network gaming, database access); and background class (e.g., email, SMS, downloading).

UMTS can also support have a virtual home environment, which is a concept for portability across network boundaries and between terminals in a personal service environment. Personal service environment means that users are consistently presented with the same personalized features, user interface customization and services in whatever network or terminal, wherever the user may be located. UMTS also includes network security and location based services.

The UMTS network 2600 can consist of three interacting domains; a user equipment (UE) domain 2602, a UMTS Terrestrial Radio Access Network (UTRAN) domain 2604, and a core network (CN) domain 2606. The UTRAN domain 2604 is also referred to as the access network domain and the CN 2606 is referred to as the core network domain, the both of which comprise an infrastructure domain.

The UE domain 2602 includes a USIM (user services identity module) domain and an ME (mobile equipment) domain. User equipment is the equipment used by the user to access UMTS services. In the UE domain 2602, the UMTS IC card is the USIM 2608 which has the same physical characteristics as GSM SIM (subscriber identity module) card. The USIM interfaces to ME 2610 via a Cu reference point. Functions of the USIM include: support of one USIM application (and optionally, more than one); support of one or more user profiles on the USIM; update of USIM specific information over the air; security functions; user authentication; optional inclusion of payment methods; and optional secure downloading of new applications.

UE terminals work as an air interface counter part for Node-B devices of the access network and have many different types of identities. Following are some of the UMTS identity types, which are taken directly from GSM specifications: international mobile subscriber identity (IMSI); temporary mobile subscriber identity (TMSI); packet temporary mobile subscriber identity (P-TMSI); temporary logical link identity (TLLI); mobile station ISDN (MSISDN); international mobile station equipment identity (IMEI); and international mobile station equipment identity and software version number (IMEISV).

A UMTS mobile station (MS) can operate in one of three modes of operation. A PS/CS mode of operation is where the MS is attached to both the PS (packet-switched) domain and CS (circuit-switched) domain, and the MS is capable of simultaneously operating PS services and CS services. A PS mode of operation is where the MS is attached to the PS domain only, and can only operate services of the PS domain. However, this does not prevent CS-like services from being offered over the PS domain (e.g., VoIP). In a third CS mode of operation, the MS is attached to the CS domain only, and can only operate services of the CS domain.

The UTRAN 2604 provides the air interface access method for the UE domain 2602. The reference point between the UE domain and the infrastructure domain is the Uu UMTS radio interface. The access network domain provides the physical entities that manage resources of the access network and facilitates access to the core network domain. In UMTS terminology, a base station of the access network domain is referred as a Node-B device 2612, and control equipment for Node-B devices is called a radio network controller (RNC) 2614. The interface between the Node-B device and the RNC 2614 is the Iub interface. The interface between two RNCs is called the Iur interface.

The functions of Node-B devices include: air interface transmission/reception; modulation and demodulation; CDMA (Code Division Multiple Access) physical channel coding; micro diversity; error handing; and closed loop power control. The functions of the RNC include: radio resource control; admission control; channel allocation; power control settings; handover control; macro diversity; ciphering; segmentation and reassembly; broadcast signaling; and open loop power control.

Wideband CDMA (WCDMA) technology was selected for UTRAN air interface. UMTS WCDMA is a direct sequence CDMA system where user data is multiplied with quasi-random bits derived from WCDMA spreading codes. In UMTS, in addition to channelization, codes are used for synchronization and scrambling. WCDMA has two basic modes of operation: frequency division duplex (FDD) and time division duplex (TDD).

The Core Network is divided in circuit-switched and packet-switched domains. Some of the circuit-switched elements are a mobile services switching center (MSC) and visitor location register (VLR) 2616 and gateway MSC (GMSC) 2618. Packet-switched elements include a serving GPRS support node (SGSN) 2620 and gateway GPRS support node (GGSN) 2622. Some network elements such as an EIR (equipment identity register) (not shown), HLR (home location register) 2624, VLR and AuC (authentication center) (not shown) can be shared by both domains.

A function of the CN 2602 is to provide switching, routing and transit for user traffic. The CN 2602 also contains the databases and network management functions. The basic CN architecture for UMTS is based on the GSM network with GPRS (general packet radio service) capability. All equipment is modified for UMTS operation and services. The radio access network has several interfaces which can be configured and dimensioned. The CN 2606 interfaces to the radio access domain via an Iu interface. An Iu-CS (circuit-switched) reference point interfaces an RNC of the access network to the MSC/VLR entity 2616 of the CN 2606 for voice from/to the MSC/VLR 2616. An Iu-PS (packet-switched) reference point interfaces an RNC of the access network to the SGSN entity 2620 of the CN 2606 for data from/to the SGSN 2620.

In the CN 2606, a Gs interface is provided between the MSC/VLR 2616 and the SGSN. A Gn interface is provided between the SGSN 2620 and the GGSN 2622. A D interface is provided between the MSC/VLR 2616 and the HLR 2624, and the HLR 2624 and the GMSC 2618. A Gr interface is provided between the SGSN 2620 and the HLR 2624. A Gc interface is provided between the GGSN 2622 and the HLR 2624.

The CN 2606 provides the interface from the UE domain 2602 to external networks 2626 such as the Internet 2628 via a Gi interface from the GGSN 2622, and other networks 2630 via the GMSC 2618, which can include a PLMN (public land mobile network), PSTN and ISDN (integrated service digital network) networks.

Asynchronous Transfer Mode (ATM) is defined for UMTS core transmission. ATM Adaptation Layer type 2 (AAL2) handles circuit-switched connection, and packet connection protocol AAL5 is designed for data delivery.

The architecture of the CN 2606 can change when new services and features are introduced. Number Portability Database (NPDB), for example, can be used to enable a user to change the network while keeping their old phone number. A gateway location register (GLR) can be employed to optimize the subscriber handling between network boundaries. Additionally, the MSC/VLR and SGSN can merge to become a UMTS MSC.

Summarizing the UMTS frequencies, 1920-1980 MHz and 2110-2170 MHz can be employed for FDD and WCDMA. Additionally, UMTS can be used in all cellular/PCS frequencies: for example, 825-849 MHz and 869-894 MHz; 1850-1910 MHz and 1930-1990 MHz. Paired uplink and downlink channel spacing can be 5 MHz and the raster can be 200 kHz. An operator can use 3-4 channels (2×15 MHz or 2×20 MHz) to build a high-speed, high-capacity network. Frequencies 1900-1920 MHz and 2010-2025 MHz can be employed for TDD and TD/CDMA. Unpaired channel spacing can be 5 MHz and the raster can be 200 kHz. Transmit and receive are not separated in frequency. Frequencies 1980-2010 MHz and 2170-2200 MHz can be employed for satellite uplink and downlink.

It is to be appreciated that mobile networks in which the disclosed architecture can be employed is not limited to UMTS, but can also include any 2G, 3G, and 4G networks, and any future networks. For example, an HSDPA (high-speed downlink packet access) network can realize benefits of the subject invention. Moreover, where the type and number of antennas that can be employed include omni-directional antennas, directional antennas, phase array antennas, and fixed array antennas, for example. Antenna mapping can be computed and stored in the base station for a particular base station environment, since generally, base stations do not move often.

Additionally, it is to be appreciated that the client can be designed as an ASIC (application specific integrated circuit) that is employed into the mobile handset or the base station, or both.

What has been described above includes examples of the invention. It is, of course, not possible to describe every conceivable combination of components or methodologies for purposes of describing the invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates communications in a communications environment, comprising:
   at least one processor that executes the following computer executable component stored on at least one computer readable storage medium:
   a channel component within a mobile device that employs a channel estimation task to determine link characteristics data of the communications environment based on local scattering characteristics estimation of a ping signal that is employed to characterize a mobile local scattering environment, wherein the ping signal is transmitted by the channel component and one or more multipath propagation echoes that are based in part on at least one of reflection, diffraction or scattering of the ping signal on one or more local environment objects are received at the mobile device and analyzed to determine the link characteristics data by the channel component, the analysis includes determination of delay spread characteristics and determination of whether a received signal strength indication (RSSI) from several base stations follows a pathloss-distance relationship, the channel component transmits the link characteristics data to a link component wherein the link characteristics data is employed to adjust performance of communication transmitted from a base station to the mobile device.

2. The system of claim 1, wherein the channel estimation task is at least one of periodic or on-demand.

3. The system of claim 1, wherein the link characteristics data includes delay spread characteristics data.

4. The system of claim 3, wherein the delay spread characteristics data is used to set a receiver of the mobile device, the receiver employed to collect the one or more multipath propagation echoes.

5. The system of claim 4, wherein the receiver is separate from the channel component.

6. The system of claim 1, wherein the performance of the communication is adjusted based in part on adjusting transmit power utilized to transmit the communication to the mobile device.

7. The system of claim 1, wherein the performance of the communication is adjusted based in part on processing multi-transmitter data associated with different transmitters of the base station.

8. The system of claim 1, wherein the performance of the communication is adjusted based in part on modifying a modulation coding scheme that is employed for transmission of the communication from the base station.

9. The system of claim 1, wherein the channel component communicates another ping signal of at least one of a higher power level or a lower power level if insufficient energy is captured.

10. The system of claim 1, wherein the link characteristics data is employed to identify information related to E-911 location assistance.

11. The system of claim 10, wherein the information for E-911 location assistance includes at least one of repeater identification or location information.

12. The system of claim 1, wherein the channel component communicates ping signals at different power levels until sufficient energy is received at the mobile device.

13. The system of claim 1, wherein the channel component determines that a user is indoors if determined that a level of spread characteristics is low and if determined that the RSSI does not follow a pathloss-distance relationship.

14. The system of claim 1, wherein the channel component determines that a user is outdoors if determined that the RSSI follows a pathloss-distance relationship.

15. The system of claim 1, further comprising a plurality of channel components on disparate mobile devices that operate with same information based on the link characteristics of the channel component.

16. The system of claim 1, wherein the link characteristics data is employed to automatically configure link performance when the channel component re-enters an area.

17. The system of claim 1, wherein the communications environment is local to a base station.

18. The system of claim 1, further comprising a machine learning and reasoning component that employs at least one of a probabilistic or statistical-based analysis to prognose or infer an action that a user desires to be automatically performed, the action includes determining an automatic adjustment to the performance.

19. A system that facilitates communications in a communications environment, comprising:
   a first mobile handset that employs a first channel component, wherein the first channel component executes a first estimation task that estimates first link characteristics data of the communications environment based on an analysis of one or more multipath propagation echoes that are received at the first mobile handset, in response to an impact of a first signal pulse, transmitted by the first mobile handset, on one or more local environment objects, wherein the analysis includes a first determination of delay spread characteristics of the one or more multipath propagation echoes and a first determination of whether a received signal strength indication (RSSI) from several base stations follows a pathloss-distance relationship, the first mobile handset transmits the first link characteristics to a base station that modifies performance of a first communication transmitted from the base station to the first mobile handset based on the first link characteristics data; and
   at least one processor that executes the first channel component, which is stored on at least one computer readable medium.

20. The system of claim 19, wherein the first estimation task is at least one of periodic or on-demand, and wherein the first link characteristics data includes delay spread characteristics data.

21. The system of claim 19, wherein the first link characteristics data is employed to modify the performance by changing a modulation coding scheme employed for transmission of the first communication from the base station to the mobile handset.

22. The system of claim 19, wherein the first link characteristics data is employed to identify information related to E-911 location assistance, wherein the information related to E-911 location assistance includes at least one of repeater identification or location information.

23. The system of claim 19, wherein the first channel component communicates one or more signal pulses at different power levels until sufficient energy is received.

24. The system of claim 19, further comprising a second mobile handset that enters the communications environment, wherein the second mobile handset comprises a second channel component, wherein the second channel component executes a second estimation task that estimates second link characteristics data of the communications environment based on an analysis of one or more multipath propagation echoes that are received by the second mobile handset, in response to an impact of a second signal pulse, transmitted by the second mobile handset, on one or more local environment objects, wherein the analysis includes a second determination of delay spread characteristics of the one or more multipath propagation echoes and a second determination of whether a received signal strength indication associated with the second mobile handset from several base stations follows a pathloss-distance relationship, the second link characteristics data different from the first link characteristics data such that the second link characteristics are employed by the base station to modify performance of a second communication transmitted from the base station to the second mobile handset.

25. The system of claim 24, wherein the first link characteristics are employed by the base station to modify performance of both the first and second communication transmitted from the base station to the first and second mobile handsets respectively.

26. The system of claim 24, wherein the second link characteristics are employed by the base station to modify performance of both the first and second communication transmitted from the base station to the first and second mobile handsets respectively.

27. The system of claim 24, wherein an average of the first and second link characteristics data is employed by the base station to modify performance of both the first and second communication transmitted from the base station to the first and second mobile handsets respectively.

28. The system of claim 24, wherein at least one of the first mobile handset or the base station initiates execution of at least one of the first or second estimation task.

29. The system of claim 24, wherein the base station signals the first mobile handset to not execute at least one of the first or second estimation task.

30. The system of claim 24, wherein the base station signals the first mobile handset to not execute at least one of the first or second estimation task based upon the first mobile handset having already executed at least one of the first or second estimation task upon a previous entry into the communications environment.

31. A system that facilitates communications in a communications environment, comprising:
   a mobile handset that facilitates mobile communications over a cellular network; and
   a mobile client of the handset that facilitates estimation of radio propagation characteristics data of a local base station communications environment based on the radio propagation characteristics data, wherein the radio propagation characteristics data is generated based in part on an analysis of one or more multipath propagation echoes received by the mobile handset, in response to an impact of a ping signal on one or more local environment objects, the ping signal is transmitted by the mobile client within an environment local to the mobile device, the analysis includes determination of delay spread characteristics of the one or more multipath propagation echoes and determination of whether a received signal strength indication from several base stations follows a pathloss-distance relationship.

32. The system of claim 31, wherein the radio propagation characteristics data is transmitted to a base station that employs the radio propagation characteristics data to enhance link performance of a communication link from the base station to the mobile handset.

33. The system of claim 31, wherein the radio propagation characteristics data includes delay spread characteristics data.

34. The system of claim 31, wherein the mobile client facilitates communication of the ping signal at a power level that produces energy sufficient for mobile communications.

35. The system of claim 31, wherein the mobile client facilitates E-911 location-based assistance, and wherein the E-911 location-based assistance includes at least one of repeater identification data or location information.

36. The system of claim 31, wherein the mobile handset switches into a receive mode after transmitting the ping signal, wherein the receive mode includes utilization of a convolution process that determines a peak output.

37. The system of claim 31, wherein the mobile handset switches into a receive mode after transmitting the ping signal, wherein the receive mode includes a measurement window that is set according to a parameter that defines an area of interest in the delay spread characteristics.

38. A method of controlling link performance of a communications environment, comprising:
employing at least one processor to execute computer executable instructions stored on at least one computer readable storage medium to perform the following acts:
executing a link estimation task associated with a communications link via a mobile handset;
entering a local communications environment associated with a base station;
transmitting a ping signal using the mobile handset within an environment local to the mobile handset;
receiving, at the mobile handset, one or more multipath propagation echoes that are based in part on an impact of the ping signal on one or more objects in the environment local to the mobile handset;
analyzing the one or more multipath propagation echoes, the analyzing includes determining delay spread characteristics of the one or more multipath propagation echoes and determining whether a received signal strength indication (RSSI) from several base stations follows a pathloss-distance relationship;
estimating link characteristics data of the communications link at the mobile handset based on the analysis; and
transmitting the link characteristics data to a base station, the link characteristics employed by the base station to enhance performance of the communications link by adjusting at least one transmission characteristic of communication transmitted by the base station to the mobile handset.

39. The method of claim 38, further comprising executing the link estimation task based upon a counter parameter.

40. The method of claim 38, further comprising executing the link estimation task based upon a mobile measurement request.

41. The method of claim 38, further comprising executing the link estimation task based upon at least one of a call initialization process, a call registration process, degradation in the communications link, cell reselection, or an E-911 location request.

42. The method of claim 38, wherein the transmitting the ping signal includes transmitting a short pulse with a carrier frequency that is outside specified operation band.

43. The method of claim 38, further comprising determining that the mobile handset is indoors of a structure if determined that a level of spread characteristics associated with the ping signal is low and if determined that the RSSI does not follow a pathloss-distance relationship.

44. The method of claim 38, wherein the enhancing performance of the communications link is performed on a channel-by-channel basis.

45. The method of claim 38, wherein the estimating link characteristics data of the communications link at the mobile handset is performed as the mobile handset moves throughout the local base station environment.

46. The method of claim 38, wherein the transmitting the ping signal includes transmitting a short pulse with a carrier frequency that is inside specified operation band.

47. A system that facilitates control of link performance in a communications environment, comprising:
at least one processor;
at least one computer readable storage medium storing computer executable instructions that when executed by the at least one processor implement components comprising:
means for executing a link estimation task associated with a communications link via a mobile handset;
means for transmitting a ping signal utilizing the mobile handset within an environment local to the mobile handset;
means for receiving, at the mobile handset, one or more multipath propagation echoes that are based in part on an impact of the ping signal on one or more objects in the environment local to the mobile;
means for analyzing the one or more multipath propagation echoes, the analyzing includes determining delay spread characteristics of the one or more multipath propagation echoes and determining whether a received signal strength indication from several base stations follows a pathloss-distance relationship;
means for estimating link characteristics data of the communications link at the mobile handset based on the analysis; and
means for transmitting the link characteristics data to a base station, the link characteristics employed by the base station to adjust performance of the communications transmitted from the base station to the mobile handset.

48. A system that facilitates communications in a communications environment, comprising:
at least one processor that executes the following computer executable component stored on at least one computer readable medium:
a link control component at a base station that receives link characteristics data of the communications environment from a channel component on a mobile device, the link characteristics data determined based on an analysis of one or more multipath propagation echoes received at the mobile device in response to an impact of a ping signal transmitted by the mobile device on one or more objects within an environment local to the mobile device, the analysis includes determination of delay spread characteristics of the one or more multipath propagation echoes and determination of whether a received signal strength indication from several base stations follows a pathloss-distance relationship, the link control component modifies performance of a communication transmitted from the base station to the mobile device based on the link characteristics data.

49. The system of claim 48, wherein the link control component adjusts transmit power utilized for the communication based on the link characteristics data.

50. The system of claim 48, wherein the link control component processes multi-transmitter data associated with different transmitters of the base station based on the link characteristics data.

51. The system of claim 48, wherein the link control component changes a modulation coding scheme that is employed for the communication based on the link characteristics data.

52. The system of claim 48, wherein the link control component identifies information related to E-911 location assistance that includes at least one of repeater identification or location information, based in part on the link characteristics data.

53. The system of claim 48, wherein the link control component automatically configures the performance of the communication when the mobile device re-enters an area.

54. The system of claim 48, wherein the link control component determines modification of link performance for disparate communication that is transmitted from the base station to one or more disparate mobile devices based on disparate analysis of a disparate link characteristics data received from the one or more disparate mobile devices.

* * * * *